(12) United States Patent
Yu et al.

(10) Patent No.: US 11,987,250 B2
(45) Date of Patent: May 21, 2024

(54) DATA FUSION METHOD AND RELATED DEVICE

(71) Applicant: HUAWEI TECHNOLOGIES CO., LTD., Guangdong (CN)

(72) Inventors: Huan Yu, Wuhan (CN); Xiao Yang, Beijing (CN); Yonggang Song, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 781 days.

(21) Appl. No.: 17/021,911

(22) Filed: Sep. 15, 2020

(65) Prior Publication Data
US 2020/0409372 A1 Dec. 31, 2020

Related U.S. Application Data

(63) Continuation of application No. PCT/CN2019/078646, filed on Mar. 19, 2019.

(30) Foreign Application Priority Data
Mar. 20, 2018 (CN) .......... 201810232615.5

(51) Int. Cl.
*B60W 40/04* (2006.01)
*G05D 1/00* (2006.01)
(Continued)

(52) U.S. Cl.
CPC .......... *B60W 40/04* (2013.01); *G05D 1/0212* (2013.01); *G06F 18/22* (2023.01); *G06F 18/25* (2023.01);
(Continued)

(58) Field of Classification Search
CPC ..... B60W 40/04; G06V 10/803; G06V 20/56; G06V 20/54; G06V 2201/07; G06F 18/22; G06F 18/25; G05D 1/0212
(Continued)

(56) References Cited

U.S. PATENT DOCUMENTS 6,445,983 B1  9/2002 Dickson et al.
6,909,997 B2  6/2005 Chen et al.
(Continued)

FOREIGN PATENT DOCUMENTS

CN  101231340 A  7/2008
CN  101393264 A  3/2009
(Continued)

OTHER PUBLICATIONS

Xiang Zhaowei, "Research and Application of Image Registration in Panorama Stitching", Master thesis of Beijing University of Posts and Telecommunications Mar. 2, 2015, total 10 pages. With an English Version.
(Continued)

*Primary Examiner* — Aditya S Bhat
(74) *Attorney, Agent, or Firm* — WOMBLE BOND DICKINSON (US) LLP

(57) ABSTRACT

This application discloses a data fusion method and a related device. The method includes: obtaining vehicle sensing data, where the vehicle sensing data is obtained by a vehicle sensing apparatus by sensing a road environment in a sensing range by using a vehicle sensor; obtaining roadside sensing data, where the roadside sensing data is obtained by a roadside sensing apparatus by sensing a road environment in a sensing range by using a roadside sensor; and fusing the vehicle sensing data and the roadside sensing data by using a fusion formula, to obtain a first fusion result. According to the foregoing solution, overlapping can be implemented
(Continued)

between the sensing range of the roadside sensing apparatus and the sensing range of the vehicle sensing apparatus can be implemented, so that the sensing range is effectively extended.

20 Claims, 10 Drawing Sheets

(51) Int. Cl.
　　　*G06F 18/22*　　　(2023.01)
　　　*G06F 18/25*　　　(2023.01)
　　　*G06V 10/80*　　　(2022.01)
　　　*G06V 20/56*　　　(2022.01)
　　　*G06V 20/54*　　　(2022.01)

(52) U.S. Cl.
　　　CPC ............ *G06V 10/803* (2022.01); *G06V 20/56* (2022.01); *G06V 20/54* (2022.01); *G06V 2201/07* (2022.01)

(58) Field of Classification Search
　　　USPC .......................................................... 702/150
　　　See application file for complete search history.

(56) References Cited

U.S. PATENT DOCUMENTS

| | | | |
|---|---|---|---|
| 7,460,951 B2* | 12/2008 | Altan | ............... G06V 10/806 701/518 |
| 2002/0099481 A1 | 7/2002 | Mori | |
| 2004/0215377 A1 | 10/2004 | Yun | |
| 2009/0115654 A1 | 5/2009 | Lo et al. | |
| 2016/0203374 A1 | 7/2016 | Zeng et al. | |
| 2018/0039269 A1 | 2/2018 | Lambermont et al. | |
| 2018/0067489 A1 | 3/2018 | Oder et al. | |
| 2019/0096238 A1* | 3/2019 | Ran | ............... G08G 1/096725 |
| 2019/0244521 A1* | 8/2019 | Ran | ............... G08G 1/22 |
| 2020/0200896 A1* | 6/2020 | Shan | ............... G05D 1/0231 |

FOREIGN PATENT DOCUMENTS

| | | |
|---|---|---|
| CN | 101807245 A | 8/2010 |
| CN | 102508246 A | 6/2012 |
| CN | 103105611 A | 5/2013 |
| CN | 103226708 A | 7/2013 |
| CN | 104854428 A | 8/2015 |
| CN | 105446338 A | 3/2016 |
| CN | 105741545 A | 7/2016 |
| CN | 106447707 A | 2/2017 |
| CN | 106503723 A | 3/2017 |
| CN | 107063275 A | 8/2017 |
| CN | 107230113 A | 10/2017 |
| CN | 107807633 A | 3/2018 |
| CN | 105741546 B | 6/2018 |
| CN | 108762245 A | 11/2018 |
| CN | 107229690 B | 1/2019 |
| JP | 2010009436 A | 1/2010 |
| JP | 2013182490 A | 9/2013 |
| JP | 2013214225 A | 10/2013 |
| JP | 2015081083 A | 4/2015 |
| JP | 2015082324 A | 4/2015 |
| WO | 2015134992 A2 | 9/2015 |

OTHER PUBLICATIONS

Dan Hu et al, "Research on Information Fusion Algorithm for Vehicle Speed information and Road Adhesion Property Estimation", Proceedings ofthe 2009 IEEE, International Conference on Mechatronics and Automation, Aug. 9-12, Changchun, China, total 6 pages.

Li Lianying et al, "Research on Integration and Updating Method of Multi-sources Electronic Map Data", Geomatics and Information Science of Wuhan University, vol. 33 No. 4, Apr. 2008, total 4 pages. With an English Abstract.

Zhou Ying et al, "Self-adaptive Sensor Weighted Data Fusion in Strain Detection", The Eighth International Conference on Electronic Measurement and Instruments, ICEMI , Aug. 18, 2007, total 4 pages.

Y i Wang et al, "Sensor Fusion Method Using GPS/IMU Data for Fast UAV Surveillance Video Frame Registration", Published in: 2009 IEEE International Conference on Acoustics, Speech and Signal Processing, Date of Conference: Apr. 19-24, 2009, total 4 pages.

Hou Zhi-qiang et al, "Simulation Study on Target Tracking by Using Radar and Image Detection Information Fusion", Journal of System Simulation, vol. 16 No. 8, Aug. 2004, total 4 pages. With an English Version.

Zhu Rui-fang et al, "Techniques of multi-source spatial data fusion-With an English Abstract", Journal of Liaoning Technical University, vol. 24 Suppl., Dec. 2005, total 3 pages. With an English Abstract.

Tan Bao-cheng et al, "The weighted average of the data fusion algorithm research of driverless vehicle sensor system", Electronic Design Engineering, vol. 23, No. 16, Aug. 2015, total 3 pages. With an English Version.

Jian Bi-jian et al, On the multi-sensor weighted fusion algorithm based on the neural network, Journal of Yunnan Minzu University(Natural Sciences Edition), 2016, 6 pages.

Liu Zhuo-fan et al, Information Fusion of INS/BD/GPS Integrated Navigation System Based on Confidence Weighted, Journal of Air Force Engineering University(Natural Science Edition), 2013, 5 pages.

Xu Junkui et al, Areal Settlements Matching Algorithm Based on Artificial Neural Network Technique, Journal of Geomatics Science and Technology, 2013, 6 pages.

C. V. PhaniShankar, S. Orth, J. Frolik and M. Abdelrahman, "Fuzzy rules for automated sensor self-validation and confidence measure," Proceedings of the 2000 American Control Conference. ACC (IEEE Cat. No. 00CH36334), 2000, pp. 2912-2916 vol. 4, doi: 10.1109/ACC.2000.878743.

Zhou J.,Huang D.-y.,Li S.-j.,et al. Weighted data fusion algorithm in the application of visual measurement network system (EI Conference)[C]. 2012 International Conference on Mechatronics and Control Engineering, ICMCE 2012, Nov. 29, 2012-Nov. 30, 2012. Guangzhou, China, 5 pages.

J. Wang, F. Meng and H. Yu, "Wetland cover information extraction research based on the multi-polar radar images and multi-spectrum optical images fusion," 2010 3rd International Congress on Image and Signal Processing, 2010, pp. 2298-2301, doi: 10.1109/CISP.2010.5647835.

* cited by examiner

DATA FUSION METHOD AND RELATED DEVICE

CROSS-REFERENCE TO RELATED APPLICATIONS

This application is a continuation of International Application No. PCT/CN2019/078646, filed on Mar. 19, 2019, which claims priority to Chinese Patent Application No. 201810232615.5 filed on Mar. 20, 2018. The disclosures of the aforementioned applications are hereby incorporated by reference in their entireties.

TECHNICAL FIELD

Embodiments of the application relate to the self-driving field, and in particular, to a data fusion method and a related device.

BACKGROUND

Road environment sensing is a primary task for implementing self-driving. A self-driving vehicle can dodge other vehicles, pedestrians, or the like on a road and implement safe driving only after sensing a road environment. To implement road environment sensing, the self-driving vehicle in the prior art detects the other vehicles, pedestrians, or the like on the road by using a vehicle sensing apparatus installed on the vehicle, thereby sensing the road environment. However, a sensing range of the vehicle sensing apparatus in the prior art is relatively narrow, and can hardly meet a requirement for self-driving.

SUMMARY

Embodiments of this application provide a data fusion method and a related device to implement overlapping between a sensing range of a roadside sensing apparatus and a sensing range of a vehicle sensing apparatus, so that the sensing range is effectively extended.

According to a first aspect, a data fusion method is provided and may be applied to a vehicle device side or a roadside device side, where the method includes:
  obtaining vehicle sensing data, where the vehicle sensing data is obtained by a vehicle sensing apparatus by sensing a road environment in a sensing range;
  obtaining roadside sensing data, where the roadside sensing data is obtained by a roadside sensing apparatus by sensing a road environment in a sensing range; and
  fusing the vehicle sensing data and the roadside sensing data by using a fusion formula, to obtain a first fusion result.

With reference to the first aspect, the fusion formula is expressed as:

$$y = f(\text{result}_r, \text{result}_v),$$

where $\text{result}_r$ is a roadside result set, the roadside result set is used to indicate the roadside sensing data, $\text{result}_v$ is a vehicle result set, the vehicle result set is used to indicate the vehicle sensing data, y is the first fusion result, and the function f is used to obtain the first fusion result by mapping based on the roadside result set and the vehicle result set.

In one embodiment, $$f(\text{result}_r, \text{result}_v) = \frac{w_r}{w_r + w_v}\text{result}_r + \frac{w_v}{w_r + w_v}\text{result}_v,$$

where $w_r$ is a confidence factor of the roadside sensing apparatus, $w_r = (w_{r1}, w_{r2}, \ldots, w_{rM})$, $\text{result}_r$ (roadside$_1$, roadside$_2$, ..., roadside$_M$), M is a quantity of target objects in the sensing range of the roadside sensing apparatus, $w_{ri}$ is a confidence factor corresponding to a target object i in the sensing range of the roadside sensing apparatus, roadside$_i$ is a roadside result unit corresponding to the target object i in the sensing range of the roadside sensing apparatus, i is a natural number, $0 < i \leq M$, $w_v$ is a confidence factor of the vehicle sensing apparatus, $w_v = (w_{v1}, w_{v2}, \ldots, w_{vN})$, $\text{result}_v$ (vehicle$_1$, vehicle$_2$, ..., vehicle$_N$), N is a quantity of target objects in the sensing range of the vehicle sensing apparatus, $w_{vj}$ is a confidence factor corresponding to a target object j in the sensing range of the vehicle sensing apparatus, vehicle$_j$ is a vehicle result unit corresponding to the target object j in the sensing range of the vehicle sensing apparatus, j is a natural number, and $0 < j \leq N$.

In one embodiment, the confidence factor is determined based on a sensing apparatus parameter, a sensing distance of the target object, and a sensing angle of the target object together.

For example, the confidence factor w may be obtained based on the following formula:

$$w = g(S_k, R_i, \theta_j), w \in [0,1]$$

where $S_k$ is the sensing apparatus parameter, $R_i$ is the sensing distance of the target object, $\theta_j$ is the sensing angle of the target object, and g is a calibration parameter table obtained through calibration of a sensing apparatus.

It should be noted that, when the sensing apparatus includes a plurality of sensors, the confidence factor may be obtained by comprehensively considering confidence of the plurality of sensors. For example, the confidence of the plurality of sensors may be comprehensively considered in a manner of weighting or averaging.

In one embodiment, the vehicle result set includes at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

In one embodiment, any vehicle result unit in the at least one vehicle result unit is expressed as vehicle$_j$ ($p_{vj}$, $v_{vj}$, $s_{vj}$, $c_{vj}$), where $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the sensing range of the vehicle sensing apparatus, j is a natural number, and $0 < j \leq N$.

In one embodiment, the roadside result set includes at least one roadside result unit, a one-to-one correspondence exists between the at least one roadside result unit and at least one target object, and each roadside result unit in the at least one roadside result unit is used to describe a feature of a corresponding target object from a multidimensional angle.

In one embodiment, any roadside result unit in the at least one roadside result unit is expressed as roadside$_i$ ($p_{vi}$, $v_{vi}$, $s_{vi}$, $c_{vi}$), where $p_{vi}$ indicates a position of the target object i detected by the roadside sensing apparatus, $v_{vi}$ indicates a speed of the target object i detected by the roadside sensing apparatus, $s_{vi}$ indicates a size of the target object i detected by the roadside sensing apparatus, $c_{vi}$ indicates a color of the target object i detected by the roadside sensing apparatus, M is the quantity of target objects in the sensing range of the roadside sensing apparatus, i is a natural number, and $0<i\leq M$.

In one embodiment, before the fusing the vehicle sensing data and the roadside sensing data by using a fusion formula, to obtain a first fusion result, the method further includes:
matching the roadside sensing data with the vehicle sensing data to obtain a matching result; and
the fusing the vehicle sensing data and the roadside sensing data, to obtain a first fusion result includes:
fusing the vehicle sensing data and the roadside sensing data based on the matching result, to obtain the first fusion result.

In one embodiment, a matching relationship between a roadside result unit in the roadside result set and a vehicle result unit in the vehicle result set is found out by using a deviation network.

For example, the matching relationship between the roadside result unit in the roadside result set and the vehicle result unit in the vehicle result set is found out by using the following formula: S=Deviation (roadside$_i$, vehicle$_j$), where S is a matching result, Deviation is the deviation network, roadside$_i$ is the roadside result unit corresponding to the target object i in the sensing range of the roadside sensing apparatus, vehicle$_j$ is the vehicle result unit corresponding to the target object j in the sensing range of the vehicle sensing apparatus, and both i and j are natural numbers.

The deviation network Deviation is indicated by a back propagation BP neural network.

In one embodiment, after the matching the roadside sensing data with the vehicle sensing data to obtain a matching result, the method further includes:
evaluating confidence of the matching result in a manner of interframe loopback and/or multiframe correlation to obtain an evaluation result; and
adjusting the deviation network based on the evaluation result.

In one embodiment, the interframe loopback is $T_{loopback}=T_1+T_2+T_3+T_4$, where $T_{loopback}$ is the interframe loopback, $T_1$ is a first matching result, $T_2$ is a second matching result, $T_3$ is a third matching result, $T_4$ is a fourth matching result, the first matching result is a matching result between a roadside result unit corresponding to the target object j detected by the roadside sensing apparatus in an $i^{th}$ frame and a vehicle result unit corresponding to the target object j detected by the vehicle sensing apparatus in the $i^{th}$ frame, the second matching result is a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame, the third matching result is a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame, and the fourth matching result is a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In one embodiment, the multiframe correlation is defined as $T_{multiframe}=T_{loopback12}+T_{loopback23}+T_{loopback34}+\ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . .

In one embodiment, when the method is applied to the roadside device side, the obtaining vehicle sensing data includes: receiving the vehicle sensing data sent by at least one vehicle device; and
after the fusing the vehicle sensing data and the roadside sensing data by using a fusion formula, to obtain a first fusion result, the method further includes:
sending the first fusion result to a target vehicle device, where the target vehicle device is configured to fuse vehicle sensing data of the target vehicle device and the first fusion result to obtain a second fusion result, and the target vehicle device belongs to the at least one vehicle device.

According to a second aspect, a data fusion method is provided and is applied to a vehicle device side, where the method includes the following operations:
sending vehicle sensing data to a roadside device, where the vehicle sensing data is obtained by a vehicle sensing apparatus by sensing a road environment in a sensing range;
receiving a first fusion result sent by the roadside device, where the first fusion result is obtained by the roadside device by fusing the vehicle sensing data sent by at least one vehicle device and roadside sensing data by using a fusion formula, and the roadside sensing data is obtained by a roadside sensing apparatus by sensing a road environment in a sensing range; and
fusing the vehicle sensing data and the first fusion result to obtain a second fusion result.

With reference to the second aspect, the fusion formula is expressed as:

$$y=f(\text{result}_r, \text{result}_v),$$

where result$_r$ is a roadside result set, the roadside result set is used to indicate the roadside sensing data, result$_v$ is a vehicle result set, the vehicle result set is used to indicate the vehicle sensing data, y is the first fusion result, and the function f is used to obtain the first fusion result by mapping based on the roadside result set and the vehicle result set.

In one embodiment, $$f(\text{result}_r, \text{result}_v) = \frac{w_r}{w_r+w_v}\text{result}_r + \frac{w_v}{w_r+w_v}\text{result}_v,$$

where $w_r$ is a confidence factor of the roadside sensing apparatus, $w_r=(w_{r1}, w_{r2}, \ldots, w_{rM})$, result$_r$ (roadside$_1$, roadside$_2$, \ldots, roadside$_M$), M is a quantity of target objects in the sensing range of the roadside sensing apparatus, $w_{ri}$ is a confidence factor corresponding to a target object i in the sensing range of the roadside sensing apparatus, roadside$_i$ is a roadside result unit corresponding to the target object i in the sensing range of the roadside sensing apparatus, i is a natural number, $0<i\leq M$, $w_v$ is a confidence factor of the vehicle sensing apparatus, $w_v=(w_{v1}, w_{v2}, \ldots, w_{vN})$, result$_v$ (vehicle$_1$, vehicle$_2$, \ldots, vehicle$_N$), N is a quantity of target objects in the sensing range of the vehicle sensing apparatus, $w_{vj}$ is a confidence factor corresponding to a target object j in the sensing range of the vehicle sensing apparatus, vehicle$_j$ is a vehicle result unit corresponding to the target object j in the sensing range of the vehicle sensing apparatus, j is a natural number, and $0<j\leq N$.

In one embodiment, the confidence factor is determined based on a sensing apparatus parameter, a sensing distance of the target object, and a sensing angle of the target object together.

For example, the confidence factor w may be obtained based on the following formula:

$$w=g(S_k, R_i, \theta_j), w \in [0,1]$$

where $S_k$ is the sensing apparatus parameter, $R_i$ is the sensing distance of the target object, $\theta_j$ is the sensing angle of the target object, and g is a calibration parameter table obtained through calibration of a sensing apparatus.

It should be noted that, when the sensing apparatus includes a plurality of sensors, the confidence factor may be obtained by comprehensively considering confidence of the plurality of sensors. For example, the confidence of the plurality of sensors may be comprehensively considered in a manner of weighting or averaging.

In one embodiment, the vehicle result set includes at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

In one embodiment, any vehicle result unit in the at least one vehicle result unit is expressed as vehicle$_j$ ($p_{vj}$, $v_{vj}$, $s_{vj}$, $c_{vj}$), where $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the sensing range of the vehicle sensing apparatus, j is a natural number, and 0<j≤N.

In one embodiment, the roadside result set includes at least one roadside result unit, a one-to-one correspondence exists between the at least one roadside result unit and at least one target object, and each roadside result unit in the at least one roadside result unit is used to describe a feature of a corresponding target object from a multidimensional angle.

In one embodiment, any roadside result unit in the at least one roadside result unit is expressed as roadside$_i$ ($p_{vi}$, $v_{vi}$, $s_{vi}$, $c_{vi}$), where $p_{vi}$ indicates a position of the target object i detected by the roadside sensing apparatus, $v_{vi}$ indicates a speed of the target object i detected by the roadside sensing apparatus, $s_{vi}$ indicates a size of the target object i detected by the roadside sensing apparatus, $c_{vi}$ indicates a color of the target object i detected by the roadside sensing apparatus, M is the quantity of target objects in the sensing range of the roadside sensing apparatus, i is a natural number, and 0<i≤M.

In one embodiment, before the fusing the vehicle sensing data and the roadside sensing data by using a fusion formula, to obtain a first fusion result, the method further includes:
matching the roadside sensing data with the vehicle sensing data to obtain a matching result; and
the fusing the vehicle sensing data and the roadside sensing data, to obtain a first fusion result includes:
fusing the vehicle sensing data and the roadside sensing data based on the matching result, to obtain the first fusion result.

In one embodiment, a matching relationship between a roadside result unit in the roadside result set and a vehicle result unit in the vehicle result set is found out by using a deviation network.

For example, the matching relationship between the roadside result unit in the roadside result set and the vehicle result unit in the vehicle result set is found out by using the following formula: S=Deviation (roadside$_i$, vehicle$_j$), where S is a matching result, Deviation is the deviation network, roadside$_i$ is the roadside result unit corresponding to the target object i in the sensing range of the roadside sensing apparatus, vehicle$_j$ is the vehicle result unit corresponding to the target object j in the sensing range of the vehicle sensing apparatus, and both i and j are natural numbers.

The deviation network Deviation is indicated by a back propagation BP neural network.

In one embodiment, after the matching the roadside sensing data with the vehicle sensing data to obtain a matching result, the method further includes:
evaluating confidence of the matching result in a manner of interframe loopback and/or multiframe correlation to obtain an evaluation result; and
adjusting the deviation network based on the evaluation result.

In one embodiment, the interframe loopback is $T_{loopback}=T_1+T_2+T_3+T_4$, where $T_{loopback}$ is the interframe loopback, $T_1$ is a first matching result, $T_2$ is a second matching result, $T_3$ is a third matching result, $T_4$ is a fourth matching result, the first matching result is a matching result between a roadside result unit corresponding to the target object j detected by the roadside sensing apparatus in an $i^{th}$ frame and a vehicle result unit corresponding to the target object j detected by the vehicle sensing apparatus in the $i^{th}$ frame, the second matching result is a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame, the third matching result is a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame, and the fourth matching result is a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In one embodiment, the multiframe correlation is defined as $T_{multiframe}=T_{loopback12}+T_{loopback23}+T_{loopback34}+ \ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . .

According to a third aspect, a fusion apparatus is provided, which includes units configured to perform the method in the first aspect.

According to a fourth aspect, a fusion apparatus is provided, which includes units configured to perform the method in the second aspect.

According to a fifth aspect, a fusion apparatus is provided, which includes a memory, and a processor and a communications module that are coupled to the memory, where the communications module is configured to send data to or receive data from outside, the memory is configured to store program code, and the processor is configured to invoke the program code stored in the memory to perform the method according to any one of the first aspect or the second aspect.

According to a sixth aspect, a computer-readable storage medium is provided and includes an instruction, where when the instruction is run on a fusion apparatus, the fusion apparatus is enabled to perform the method according to any one of the first aspect or the second aspect.

According to a seventh aspect, a computer program product including an instruction is provided, where when the computer program product is run on a computer, the computer is enabled to perform the method according to any one of the first aspect or the second aspect.

According to the foregoing solutions, the roadside sensing data obtained by the roadside sensing apparatus by sensing and the vehicle sensing data obtained by the vehicle sensing apparatus by sensing are fused to implement overlapping between the sensing range of the roadside sensing apparatus and the sensing range of the vehicle sensing apparatus, so that the sensing range is effectively extended.

BRIEF DESCRIPTION OF DRAWINGS

To describe the technical solutions in the embodiments more clearly, the following briefly introduces the accompanying drawings required for describing the embodiments. The accompanying drawings in the following description show some embodiments, and a person of ordinary skill in the art may still derive other drawings from these accompanying drawings without creative efforts.

DESCRIPTION OF EMBODIMENTS

Figure 1:
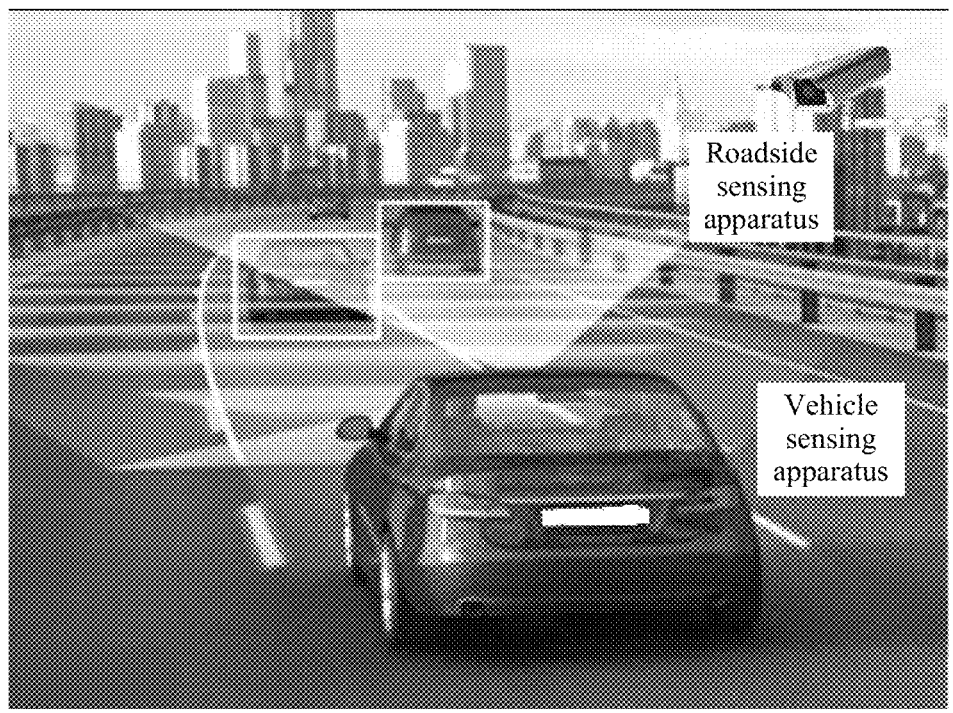
FIG. 1 is a schematic diagram of an application scenario according to an embodiment of this application.

FIG. 1 is a schematic diagram of an application scenario according to an embodiment of this application. As shown in FIG. 1, at least one roadside device is installed on a side of a road, and a vehicle device is installed on at least one of the vehicles that drive on the road.

The roadside device is configured to sense a road environment from a roadside angle to obtain roadside sensing data. A roadside sensing apparatus may be configured for the roadside device. The roadside sensing apparatus may include at least one roadside sensor, for example, a microwave radar and a millimeter-wave radar, and can identify roadside sensing data such as positions, speeds, and sizes of target objects (for example, a vehicle and a pedestrian) in a sensing range. The roadside sensing apparatus may further include a roadside sensor such as a camera. The camera not only can identify roadside sensing data such as the positions, speeds, and sizes of the target objects in the sensing range, but also can identify roadside sensing data such as colors of the target objects (for example, a color of the vehicle and a color of clothes of the pedestrian) in the sensing range. It may be understood that, the foregoing several examples are only examples of the roadside sensor, and should not constitute a limitation. The roadside sensing apparatus may use any one of the roadside sensors alone, or may use any plurality of the roadside sensors simultaneously. The roadside sensing data may be described in a form of a roadside result set, where the roadside result set may include a plurality of roadside result units, and each roadside result unit corresponds to one target object. For example, assuming that a roadside result unit may be expressed as roadside$_i$ ($p_r$, $v_r$, $s_r$, $c_r$), where $p_r$ indicates a position of a target object detected by the roadside sensing apparatus, $v_r$ indicates a speed of the target object detected by the roadside sensing apparatus, $s_r$ indicates a size of the target object detected by the roadside sensing apparatus, and $c_r$ indicates a color of the target object detected by the roadside sensing apparatus, the roadside result set may be expressed as result$_r$ (roadside$_1$, roadside$_2$, ..., roadside$_M$), where M is a quantity of the target objects in the sensing range of the roadside sensing apparatus. In one embodiment, using a matrix form as an example, the roadside result set may be expressed as:

$$\text{result}_r = \begin{bmatrix} \text{roadside}_1(p_{r1}, v_{r1}, s_{r1}, c_{r1}) \\ \text{roadside}_2(p_{r2}, v_{r2}, s_{r2}, c_{r2}) \\ \vdots \\ \text{roadside}_M(p_{rM}, v_{rM}, s_{rM}, c_{rM}) \end{bmatrix}.$$

The vehicle device is configured to sense a road environment from a vehicle angle to obtain vehicle sensing data. A vehicle sensing apparatus may be configured for the vehicle device. The vehicle sensing apparatus may include at least one vehicle sensor, for example, a combined inertial navigation, a microwave radar, a millimeter-wave radar, and a camera. Different vehicle sensors may detect different vehicle sensing data. For example, the vehicle sensing apparatus can identify roadside sensing data such as positions and speeds of target objects by using the combined inertial navigation. The vehicle sensing apparatus can identify roadside sensing data such as positions, speeds, and sizes of target objects in a sensing range by using the microwave radar and the millimeter-wave radar. The vehicle sensing apparatus can identify roadside sensing data such as the positions, speeds, sizes, and colors of the target objects in the sensing range by using the camera. It may be understood that, the foregoing several examples are only examples of the vehicle sensor, and should not constitute a limitation. The vehicle sensing apparatus may use any one of the vehicle sensors alone, or may use any plurality of the vehicle sensors simultaneously. The vehicle sensing data may be described in a form of a vehicle result set, where the vehicle result set may include a plurality of vehicle result units, and each vehicle result unit corresponds to one target object. A vehicle result unit describes a feature of a target object from a multidimensional angle, for example, a position, a speed, a size, and a color. For example, assuming that a vehicle result unit may be expressed as vehicle ($p_v$, $v_v$, $s_v$, $c_v$), where $p_v$ indicates a position of a target object detected by the vehicle sensing apparatus, $v_v$ indicates a speed of the target object detected by the vehicle sensing apparatus, $s_v$ indicates a size of the target object detected by the vehicle sensing apparatus, and $c_v$ indicates a color of the target object detected by the vehicle sensing apparatus, the vehicle result set may be expressed as $result_v$ ($vehicle_1$, $vehicle_2$, . . ., $vehicle_N$), where N is a quantity of the target objects in the sensing range of the vehicle sensing apparatus. In one embodiment, using a matrix form as an example, the vehicle result set may be expressed as:

$$result_r = \begin{bmatrix} vehicel_1(p_{v1}, v_{v1}, s_{v1}, c_{v1}) \\ vehicel_2(p_{v2}, v_{v2}, s_{v2}, c_{v2}) \\ \vdots \\ vehicel_N(p_{vN}, v_{vN}, s_{vN}, c_{vN}) \end{bmatrix}.$$

In this embodiment of this application, the roadside device and the vehicle device may be connected in a wireless manner to implement data communication.

In this embodiment of this application, the roadside device and/or the vehicle device may perform, by using a fusion formula, data fusion on the roadside sensing data detected by the roadside sensing apparatus in the sensing range and the vehicle sensing data detected by the vehicle sensing apparatus in the sensing range, to obtain a first fusion result. In an example in which the roadside result set indicates the roadside sensing data and the vehicle result set indicates the vehicle sensing data, the fusion formula may be expressed as y=f($result_r$, $result_v$), where $result_r$ is the roadside result set, $result_v$ is the vehicle result set, y is the first fusion result, and f is used to obtain the first fusion result by mapping based on the roadside result set and the vehicle result set.

In one embodiment, the function f may be expressed as:

$$f(result_r, result_v) = \frac{w_r}{w_r + w_v} result_r + \frac{w_v}{w_r + w_v} result_v,$$

where $w_r$ is a confidence factor of the roadside sensing apparatus, $w_r$ may be multidimensional data, that is, $w_r$=($w_{r1}$, $w_{r2}$, . . . , $w_{rM}$), $result_r$ ($roadside_1$, $roadside_2$, . . . , $roadside_M$), M is the quantity of the target objects in the sensing range of the roadside sensing apparatus, $w_{ri}$ is a confidence factor corresponding to a target object i in the sensing range of the roadside sensing apparatus, $roadside_i$ is a roadside result unit corresponding to the target object i in the sensing range of the roadside sensing apparatus, i is a natural number less than M, $w_v$ is a confidence factor of the vehicle sensing apparatus, $w_v$ may be multidimensional data, that is, $w_v$=($w_{v1}$, $w_{v2}$, . . . , $w_{vN}$), N is the quantity of the target objects in the sensing range of the vehicle sensing apparatus, $w_{vj}$ is a confidence factor corresponding to a target object j in the sensing range of the vehicle sensing apparatus, $vehicle_j$ is a vehicle result unit corresponding to the target object j in the sensing range of the vehicle sensing apparatus, and j is a natural number less than N. It may be understood that, the confidence factor of the roadside sensing apparatus may be divided more finely, so that different elements in the roadside result unit correspond to different confidence factors. Likewise, the confidence factor of the vehicle sensing apparatus may also be divided more finely, so that different elements in the vehicle result unit correspond to different confidence factors. In one embodiment, $$result_r = \begin{bmatrix} roadside_1(p_{r1}, v_{r1}, s_{r1}, c_{r1}) \\ roadside_2(p_{r2}, v_{r2}, s_{r2}, c_{r2}) \\ roadside_i(p_{ri}, v_{ri}, s_{ri}, c_{ri}) \\ \vdots \\ roadside_M(p_{rM}, v_{rM}, s_{rM}, c_{rM}) \end{bmatrix}, \text{when}$$

$$w_r = \begin{bmatrix} w_{r1}(w_{r1}^p, w_{r1}^v, w_{r1}^s, w_{r1}^c) \\ w_2(w_{r2}^p, w_{r2}^v, w_{r2}^s, w_{r2}^c) \\ w_{ri}(w_{ri}^p, w_{ri}^v, w_{ri}^s, w_{ri}^c) \\ \vdots \\ w_{rM}(w_{rM}^p, w_{rM}^v, w_{rM}^s, w_{rM}^c) \end{bmatrix}; \text{ and}$$

$$result_v = \begin{bmatrix} vehicel_1(p_{v1}, v_{v1}, s_{v1}, c_{v1}) \\ vehicel_2(p_{v2}, v_{v2}, s_{v2}, c_{v2}) \\ vehicel_j(p_{vj}, v_{vj}, s_{vj}, c_{vj}) \\ \vdots \\ vehicel_N(p_{rN}, v_{rN}, s_{rN}, c_{rN}) \end{bmatrix}, \text{when}$$

$$w_v = \begin{bmatrix} w_{v1}(w_{v1}^p, w_{v1}^v, w_{v1}^s, w_{v1}^c) \\ w_{v2}(w_{v2}^p, w_{v2}^v, w_{v2}^s, w_{v2}^c) \\ w_{vj}(w_{vj}^p, w_{vji}^v, w_{vj}^s, w_{vj}^c) \\ \vdots \\ w_{rN}(w_{vN}^p, w_{vN}^v, w_{vN}^s, w_{vN}^c) \end{bmatrix}.$$

It is easily understood that, if a ratio of the confidence factor of the roadside sensing apparatus to the confidence factor of the vehicle sensing apparatus is larger, a ratio of a proportion of the roadside sensing data in the fusion result to a proportion of the vehicle sensing data in the fusion result is larger. Simply, if a value of a confidence factor of a sensing apparatus is larger, a proportion of sensing data obtained by the sensing apparatus through detection in the fusion result is larger.

It should be noted that, the confidence factor may be determined based on a sensing apparatus parameter, a sensing distance of the target object, and a sensing angle of the target object together. The sensing apparatus parameter is related to initial precision, a spatial installation angle, and installation coordinates of the sensing apparatus. The sensing distance of the target object is a distance between the target object and the sensing apparatus in a sensing coordinate system. The sensing angle of the target object is an angle formed between the target object and the sensing apparatus in the sensing coordinate system. It should be noted that, when the sensing apparatus includes a plurality of sensors, the confidence factor may be obtained in a manner of weighting or averaging by comprehensively considering confidence of the plurality of sensors. In one embodiment, the confidence factor may be obtained based on the following formula:

$w=g(S_k, R_i, \theta_j), w \in [0,1]$, where $S_k$ is the sensing apparatus parameter, $R_i$ is the sensing distance, $\theta_j$ is the sensing angle, and g is a calibration parameter table obtained through calibration of the sensing apparatus. The calibration parameter table may be obtained through inverse deducing by using data of a large quantity of known target objects in a calibration process of the sensor apparatus. It is easily understood that, if precision of the sensing apparatus parameter is higher, the value of the confidence factor is larger, or if precision of the sensing apparatus parameter is lower, the value of the confidence factor is smaller; if the sensing distance is shorter, the value of the confidence factor is larger, or if the sensing distance is longer, the value of the confidence factor is smaller; and if the sensing angle is smaller, the value of the confidence factor is larger, or if the sensing angle is larger, the value of the confidence factor is smaller.

In one embodiment, the sensing apparatus parameter may be obtained based on the following formula: $S_k=h(S_0, A, P)$, where $S_k$ is the sensing apparatus parameter, $S_0$ is the initial precision of the sensing apparatus parameter, A is the spatial installation angle of the sensing apparatus, that is, a spatial angle relative to ground of the road after the sensing apparatus is installed, and P is the installation coordinates of the sensing apparatus, that is, three-dimensional coordinates relative to the ground of the road after the sensing apparatus is installed.

Figure 2:
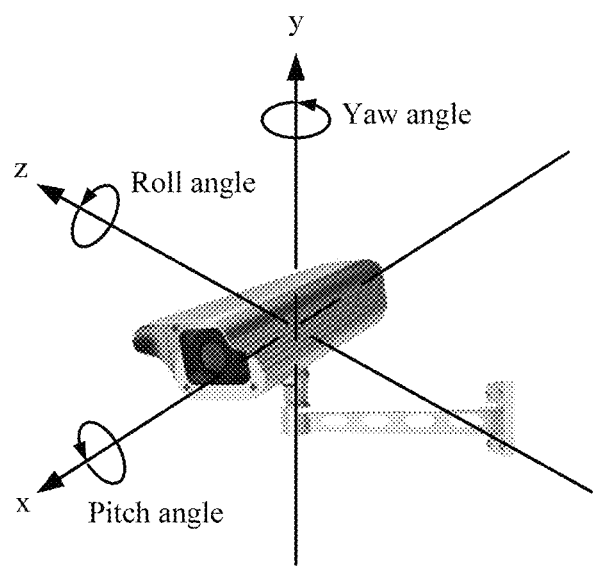
FIG. 2 is a schematic diagram of a spatial installation angle of a sensing apparatus according to an embodiment of this application.

In one embodiment, the spatial installation angle of the sensing apparatus may be defined as: A=(yaw, pitch, roll), where yaw is a yaw angle of the sensing apparatus relative to the ground of the road, pitch is a pitch angle of the sensing apparatus relative to the ground of the road, and roll is a roll angle of the sensing apparatus relative to the ground of the road. As shown in FIG. 2, in an example in which right-handed Cartesian coordinates are created relative to the ground of the road, the yaw angle yaw may be defined as an angle obtained by rotating the sensing apparatus around a y-axis, the pitch angle pitch may be defined as an angle obtained by rotating the sensing apparatus around an x-axis, and the roll angle roll may be defined as an angle obtained by rotating the sensing apparatus around a z-axis.

Figure 3:
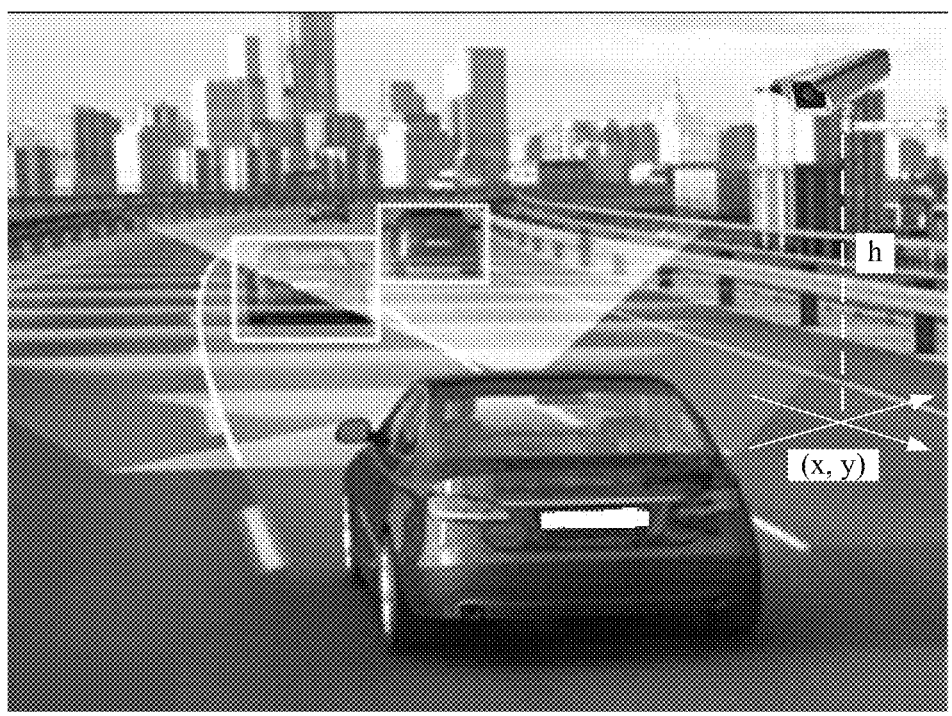
FIG. 3 is a schematic diagram of installation coordinates of a sensing apparatus according to an embodiment of this application.

In one embodiment, the installation coordinates of the sensing apparatus may be defined as: P=(x, y, h). As shown in FIG. 3, x and y indicate coordinates of the sensing apparatus projected on the ground of the road, and h indicates a vertical distance from the sensing apparatus to the ground of the road.

Figure 4:
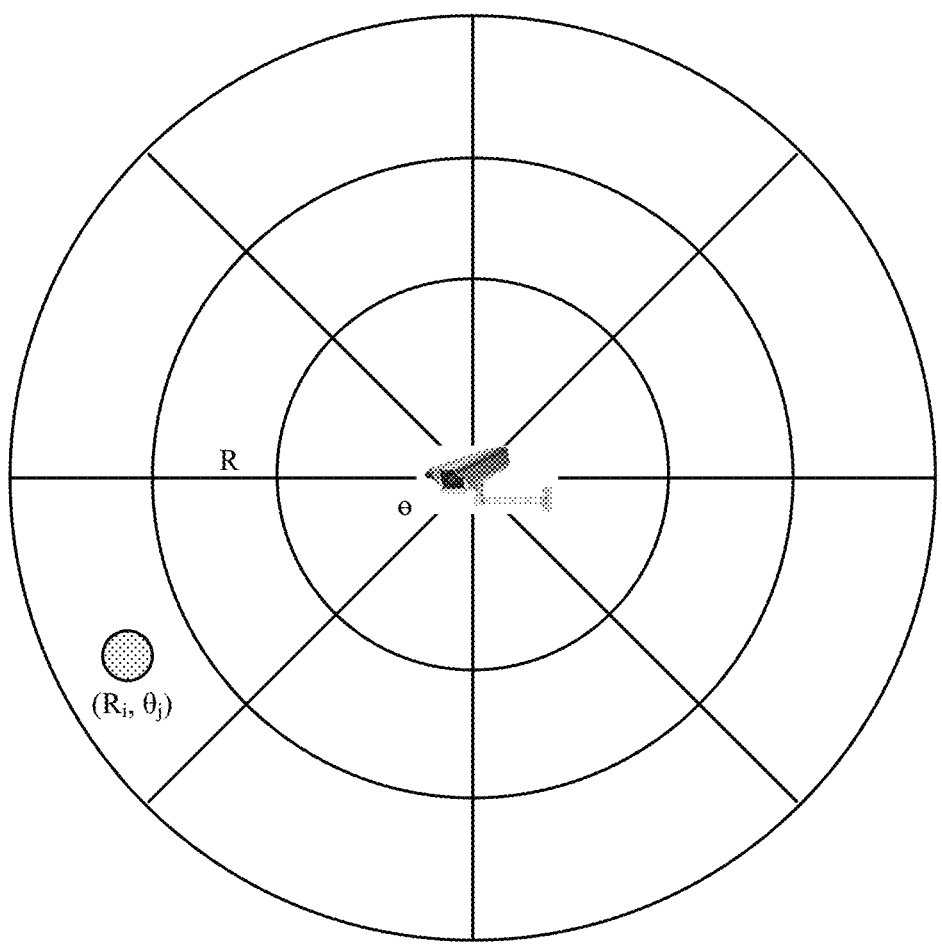
FIG. 4 is a schematic diagram of a sensing coordinate system according to an embodiment of this application.

In one embodiment, the sensing distance of the target object and the sensing angle of the target object may be obtained in the following manner: As shown in FIG. 4, using the sensing apparatus as a center, the sensing range of the sensing apparatus is divided into sector areas of different distances and different angles, so that a sensing coordinate system is created. The sensing apparatus determines the sensing distance $R_i$ of the target object and the sensing angle $\theta_j$ of the target object based on a sector area within which the target object falls in the sensing coordinate system.

Before performing data fusion on the roadside sensing data and the vehicle sensing data to obtain the fusion result, the roadside device and/or the vehicle device need/needs to match the roadside sensing data with the vehicle sensing data to obtain a matching result, so that the roadside device and/or the vehicle device can perform data fusion on the roadside sensing data and the vehicle sensing data based on the matching result.

The following uses an example to describe a meaning of matching the roadside sensing data with the vehicle sensing data. It is assumed that the roadside sensing data expressed in the form of the roadside result set is: $result_r$ ($roadside_1$, $roadside_2$, ..., $roadside_M$), and that the vehicle sensing data expressed in the form of the vehicle result set is: $result_v$ ($vehicle_1$, $vehicle_2$, ..., $vehicle_N$), where M is the quantity of the target objects in the sensing range of the roadside sensing apparatus, N is the quantity of the target objects in the sensing range of the vehicle sensing apparatus, and M>N, where $roadside_1$ is a roadside result unit obtained by the roadside sensing apparatus by detecting a target object 1, $roadside_2$ is a roadside result unit obtained by the roadside sensing apparatus by detecting a target object 1, ..., and $roadside_M$ is a roadside result unit obtained by the roadside sensing apparatus by detecting a target object M; and $vehicle_1$ is a vehicle result unit obtained by the vehicle sensing apparatus by detecting the target object 1, $vehicle_2$ is a vehicle result unit obtained by the vehicle sensing apparatus by detecting the target object 1, ..., and $vehicle_N$ is a vehicle result unit obtained by the vehicle sensing apparatus by detecting a target object N. Therefore, $roadside_1$ and $vehicle_1$ are both result units obtained by detecting the target object 1, and have a matching relationship; $roadside_2$ and $vehicle_2$ are both result units obtained by detecting the target object 2, and have a matching relationship; ...; $roadside_N$ and $vehicle_N$ are both result units obtained by detecting the target object N, and have a matching relationship. Therefore, matching the roadside sensing data with the vehicle sensing data is finding out all matching relationships between roadside result units in the roadside sensing data and vehicle result units in the vehicle sensing data.

In this embodiment of this application, the roadside device and/or the vehicle device may find out a matching relationship between a roadside result unit in the roadside sensing data and a vehicle result unit in the vehicle sensing data by using a deviation network. In one embodiment, the roadside result unit and the vehicle result unit are used as an input of the deviation network. In this case, the deviation network outputs a matching result between the roadside result unit and the vehicle result unit. If the matching result output by the deviation network is that the roadside result unit matches the vehicle result unit, it may be considered that the matching relationship exists between the roadside result unit and the vehicle result unit; or if the matching result output by the deviation network is that the roadside result unit does not match the vehicle result unit, it may be considered that the matching relationship does not exist between the roadside result unit and the vehicle result unit. Still using the foregoing example as an example, if $roadside_1$ and $vehicle_1$ are used as an input of the deviation network, and a matching result output by the deviation network is that $roadside_1$ matches $vehicle_1$, it may be determined that a matching relationship exists between $roadside_1$ and $vehicle_1$, or if $roadside_1$ and $vehicle_2$ are used as an input of the deviation network, and a matching result output by the deviation network is that $roadside_1$ does not match $vehicle_2$, it may be determined that a matching relationship does not exist between $roadside_1$ and $vehicle_2$.

In this embodiment of this application, the matching relationship between the roadside result unit in the roadside sensing data and the vehicle result unit in the vehicle sensing data may be found out by using the following formula: S=Deviation ($roadside_i$, $vehicle_j$), where S is a matching result, Deviation is the deviation network, $roadside_i$ is the roadside result unit corresponding to the target object i in the sensing range of the roadside sensing apparatus, $vehicle_j$ is the vehicle result unit corresponding to the target object j in the sensing range of the vehicle sensing apparatus, and both i and j are natural numbers.

Figure 5:
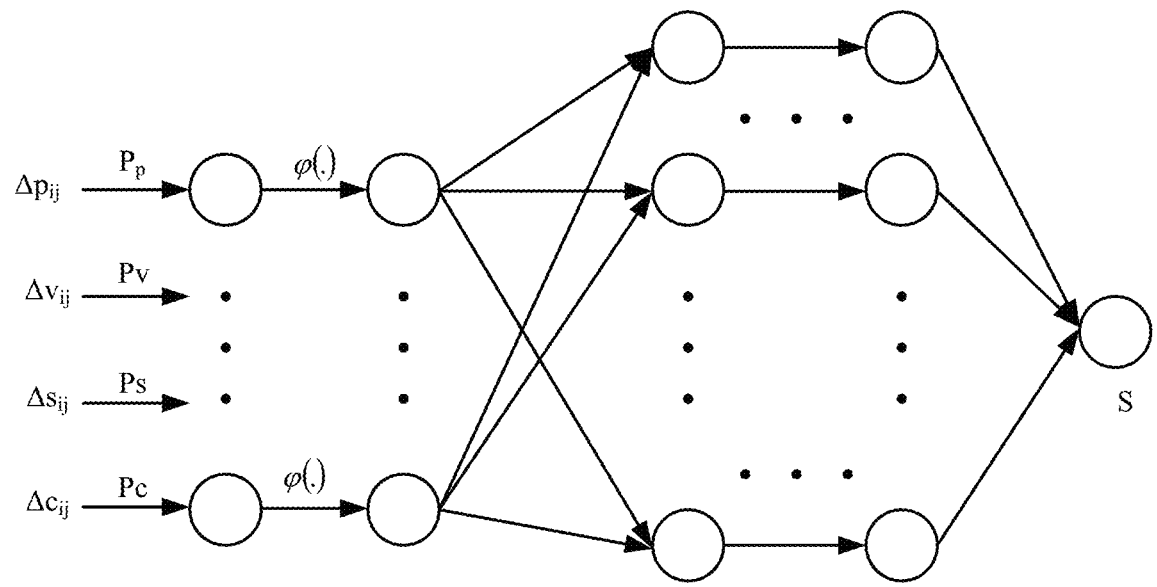
FIG. 5 is a schematic structural diagram of a back propagation neural network according to an embodiment of this application.

Using $roadside_i=(p_{ri}, v_{ri}, s_{ri}, c_{ri})$ and $vehicle_j=(p_{vj}, v_{vj}, s_{vj}, c_{vj})$ as an example, in one embodiment, the deviation network Deviation may be expressed by using a back propagation (back propagation, BP) neural network shown in FIG. 5, where $\Delta p_{ij}$ is a position deviation, $\Delta p_{ij}=\text{fabs}(p_{ri}-p_{vj})$, $p_{ri}$ is a position of the target object i detected by the roadside sensing apparatus, $p_{vj}$ is a position of the target object j detected by the vehicle sensing apparatus, and fabs is a function for obtaining an absolute value;

$\Delta v_{ij}$ is a speed deviation, $\Delta v_{ij}=\text{fabs}(v_{ri}-v_{vj})$, $v_{ri}$ is a speed of the target object i detected by the roadside sensing apparatus, and $v_{vj}$ is a speed of the target object j detected by the vehicle sensing apparatus;

$\Delta s_{ij}$ is a size deviation, $\Delta s_{ij}=\text{fabs}(s_{ri}-s_{vj})$, $s_{ri}$ is a size of the target object i detected by the roadside sensing apparatus, and $s_{vj}$ is a size of the target object j detected by the vehicle sensing apparatus;

$\Delta c_{ij}$ is a color deviation, $\Delta c_{ij}$=fabs ($c_{ri}$–$c_{vj}$), $c_{ri}$ is a color of the target object i detected by the roadside sensing apparatus, and $c_{vj}$ is a color of the target object j detected by the vehicle sensing apparatus;

$P_p$ is a position deviation factor, $$P_p = \frac{1}{1+\exp(-w_{ri}^p w_{vj}^p)},$$

$w_{ri}^p$ is a confidence factor corresponding to the position of the target object i detected by the roadside sensing apparatus, and $w_{vj}^p$ is a confidence factor corresponding to the position of the target object j detected by the vehicle sensing apparatus;

$P_v$ is a speed deviation factor, $$P_v = \frac{1}{1+\exp(-w_{ri}^v w_{vj}^v)},$$

$w_{ri}^v$ is a confidence factor corresponding to the speed of the target object i detected by the roadside sensing apparatus, and $w_{vj}^v$ is a confidence factor corresponding to the speed of the target object j detected by the vehicle sensing apparatus;

$P_s$ is a size deviation factor, $$P_s = \frac{1}{1+\exp(-w_{ri}^s w_{vj}^s)},$$

$w_{ri}^s$ is a confidence factor corresponding to the size of the target object i detected by the roadside sensing apparatus, and $w_{vj}^s$ is a confidence factor corresponding to the size of the target object j detected by the vehicle sensing apparatus;

$P_c$ is a speed deviation factor, $$P_c = \frac{1}{1+\exp(-w_{ri}^c w_{vj}^c)},$$

$w_{ri}^c$ is a confidence factor corresponding to the color of the target object i detected by the roadside sensing apparatus, and $w_{vj}^c$ is a confidence factor corresponding to the color of the target object j detected by the vehicle sensing apparatus; and φ(•) is an activation function, where the activation function may be a leaky rectified linear unit (LReLU), a parameteric rectified linear unit (PReLU), a randomized leaky rectified linear unit (RReLU), a ReLUSoftplus function, a Softsign function, a Sigmoid function, or a tanh function.

It should be noted that, for a method for obtaining $w_{ri}^p$, $w_{vj}^p$, $w_{ri}^v$, $w_{vj}^v$, $w_{ri}^s$, $w_{vj}^s$, $w_{ri}^c$, and $w_{vj}^c$, reference may be made to the foregoing paragraphs related to the confidence factors. Details are not described again herein.

In the foregoing example, the deviation network is described by using the BP neural network as an example. In one embodiment, the deviation network may be a long short-term memory (LSTM) network, a residual network (ResNet), a recurrent neural network (RNN), or the like. This is not specifically limited herein.

In the foregoing content, matching is implemented between roadside sensing data and vehicle sensing data in a single frame only, and confidence of a matching result is not high. To resolve the foregoing problem, matching between roadside sensing data and vehicle sensing data in two frames or even more frames may be considered, so that confidence of a matching result is improved. Further, the roadside device and/or the vehicle device may further evaluate confidence of the matching result in a manner of interframe loopback and/or multiframe correlation to obtain an evaluation result, and adjust the deviation network based on the evaluation result.

In this embodiment of this application, the interframe loopback is mainly obtained through calculation based on a matching result obtained by cross-matching between roadside sensing data and vehicle sensing data in adjacent frames. Using a result unit as an example, the interframe loopback is mainly obtained based on an intraframe matching result and an interframe matching result of adjacent frames. The intraframe matching result is a matching result obtained by matching result units that are obtained by different sensing apparatuses by detecting a same target object in a same frame. The interframe matching result is a matching result obtained by matching result units that are obtained by a same sensing apparatus by detecting a same target object in adjacent frames.

Figure 6:
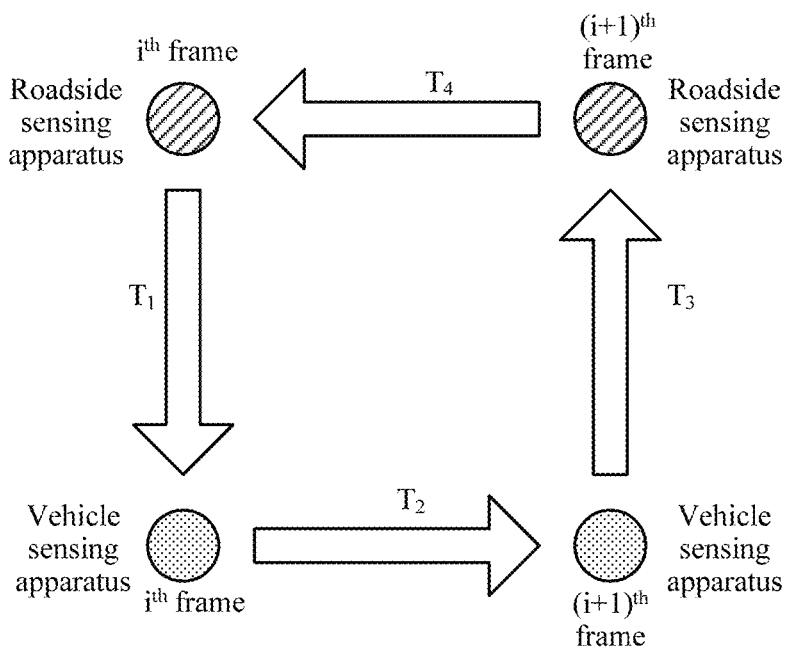
FIG. 6 is a schematic diagram of interframe loopback according to an embodiment of this application.

Using the roadside sensing apparatus and the vehicle sensing apparatus as an example, as shown in FIG. 6, the interframe loopback may be defined as: $T_{loopback}=T_1+T_2+T_3+T_4$, where $T_{loopback}$ is the interframe loopback, $T_1$ is a first matching result, $T_2$ is a second matching result, $T_3$ is a third matching result, and $T_4$ is a fourth matching result. The first matching result is an intraframe matching result of an $i^{th}$ frame, that is, a matching result between a roadside result unit corresponding to the target object j detected by the roadside sensing apparatus in the $i^{th}$ frame and a vehicle result unit corresponding to the target object j detected by the vehicle sensing apparatus in the $i^{th}$ frame. The second matching result is an interframe matching result of the vehicle sensing apparatus, that is, a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame. The third matching result is an intraframe matching result of the $(i+1)^{th}$ frame, that is, a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame. The fourth matching result is an interframe matching result of the roadside sensing apparatus, that is, a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

Figure 7:
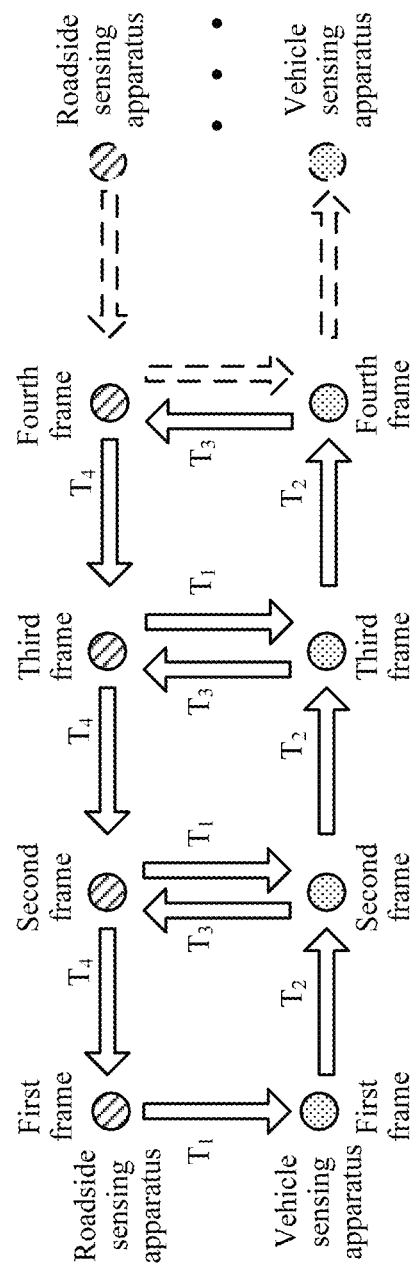
FIG. 7 is a schematic diagram of multiframe correlation according to an embodiment of this application.

In this embodiment of this application, the multiframe correlation is mainly obtained based on interframe loopback between a plurality of consecutive frames. In one embodiment, as shown in FIG. 7, the multiframe correlation may be defined as $T_{multiframe}=T_{loopback12}+T_{loopback23}+T_{loopback34}+\ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . , and so on.

It is easily understood that, the data fusion performed by the roadside device and/or the vehicle device brings at least the following two benefits:

1. Overlapping can be implemented between the sensing range of the roadside sensing apparatus and the sensing range of the vehicle sensing apparatus, so that the sensing range of the roadside sensing apparatus and/or the vehicle sensing apparatus is effectively extended. For example, assuming that the quantity of the target objects detected by the roadside sensing apparatus in the sensing range is 3 (target object 1, target object 2, and target object 3), and that the quantity of the target objects detected by the vehicle sensing apparatus in the sensing range is 2 (target object 3 and target object 4), after the vehicle sensing apparatus fuses the roadside sensing data and the vehicle sensing data, the sensing range of the fusion result includes four target objects (target object 1, target object 2, target object 3, and target object 4).

2. Low-confidence data can be corrected by using high-confidence data, so that confidence of data of the roadside sensing apparatus and/or the vehicle sensing apparatus is effectively improved. For example, assuming that confidence of a speed of a target object obtained by the roadside sensing apparatus through measurement is lower than confidence of a speed of a target object obtained by the vehicle sensing apparatus through measurement, the roadside sensing apparatus may use the speed of the target object obtained by the vehicle sensing apparatus through measurement to correct the speed of the target object obtained by the roadside sensing apparatus through measurement, to obtain high-confidence data.

The foregoing content of the specification focuses on a solution about how to implement data fusion on the roadside sensing data detected by the roadside sensing apparatus in the sensing range and the vehicle sensing data detected by the vehicle sensing apparatus in the sensing range. The following describes, from perspectives of a data fusion method and a related device, how the roadside sensing apparatus and/or the vehicle sensing apparatus use/uses the foregoing data fusion solution to extend the sensing range.

Figure 8:
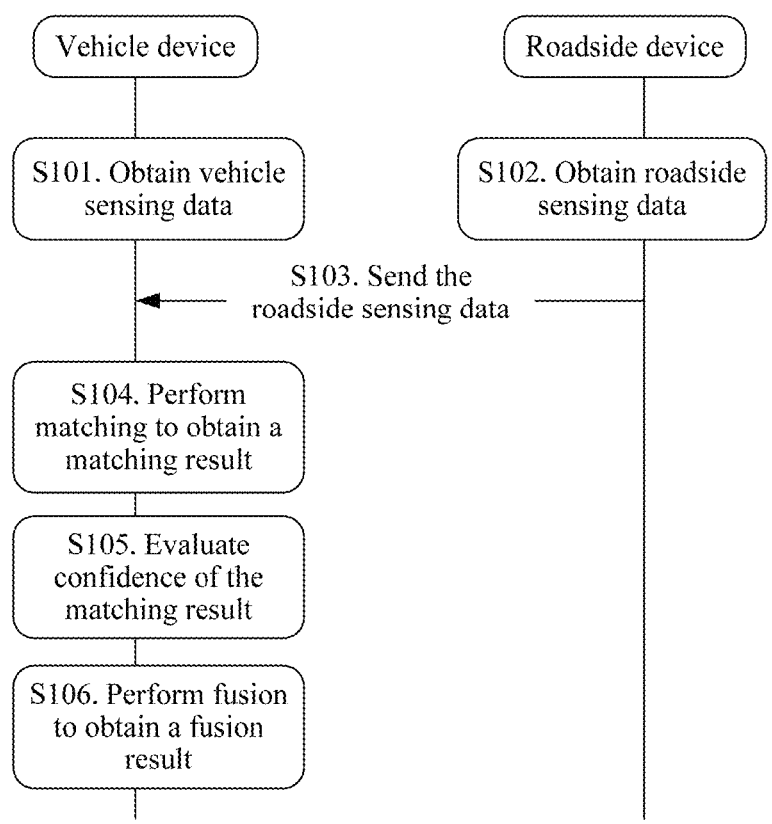
FIG. 8 is a schematic flowchart of a first data fusion method according to an embodiment of this application.

FIG. 8 is a schematic flowchart of a first data fusion method according to an embodiment of this application. As shown in FIG. 8, the data fusion method in this embodiment of this application includes the following operations:

S101. A vehicle device obtains vehicle sensing data, where the vehicle sensing data is obtained by a vehicle sensing apparatus by sensing a road environment in a sensing range by using a vehicle sensor.

In this embodiment of this application, the vehicle sensing apparatus may be configured for the vehicle sensing device. The vehicle sensing apparatus includes at least one vehicle sensor, for example, a combined inertial navigation, a microwave radar, a millimeter-wave radar, and a camera, and can identify vehicle sensing data of a target object in the sensing range. The vehicle sensing data may include a position, a speed, a size, a color, and the like of the target object.

It may be understood that, the foregoing several examples are only examples of the vehicle sensor, and should not constitute a limitation. The vehicle sensing apparatus may use any one of the vehicle sensors alone, or may use any plurality of the vehicle sensors simultaneously.

S102. A roadside device obtains roadside sensing data, where the roadside sensing data is obtained by a roadside sensing apparatus by sensing a road environment in a sensing range by using a roadside sensor.

In this embodiment of this application, the roadside sensing apparatus may be configured for the roadside device. The roadside sensing apparatus includes at least one roadside sensor, for example, a microwave radar and a millimeter-wave radar, and can identify roadside sensing data of a target object in the sensing range. The roadside sensing data may include a position, a speed, a size, a color, and the like of the target object.

It may be understood that, the foregoing several examples are only examples of the roadside sensor, and should not constitute a limitation. The roadside sensing apparatus may use any one of the roadside sensors alone, or may use any plurality of the roadside sensors simultaneously.

S103. The roadside device sends the roadside sensing data to the vehicle device. Correspondingly, the vehicle device receives the roadside sensing data sent by the roadside device.

S104. The vehicle device matches the roadside sensing data with the vehicle sensing data to obtain a matching result.

In this embodiment of this application, the vehicle device may find out a matching relationship between a roadside result unit in the roadside sensing data and a vehicle result unit in the vehicle sensing data by using a deviation network. In one embodiment, the roadside result unit and the vehicle result unit are used as an input of the deviation network. In this case, the deviation network outputs a matching result between the roadside result unit and the vehicle result unit.

In this embodiment of this application, the matching relationship between the roadside result unit in the roadside sensing data and the vehicle result unit in the vehicle sensing data may be found out by using the following formula: S=Deviation (roadside$_i$, vehicle$_j$), where S is a matching result, Deviation is the deviation network, roadside$_i$ is a roadside result unit corresponding to a target object i in the sensing range of the roadside sensing apparatus, vehicle$_j$ is a vehicle result unit corresponding to a target object j in the sensing range of the vehicle sensing apparatus, and both i and j are natural numbers.

S105. The vehicle device evaluates confidence of the matching result in a manner of interframe loopback and/or multiframe correlation, and adjusts the deviation network based on an evaluation result.

In this embodiment of this application, the interframe loopback may be defined as: $T_{loopback}=T_1+T_2+T_3+T_4$, where $T_{loopback}$ is the interframe loopback, $T_1$ is a first matching result, $T_2$ is a second matching result, $T_3$ is a third matching result, and $T_4$ is a fourth matching result. The first matching result is an intraframe matching result of an $i^{th}$ frame, that is, a matching result between a roadside result unit corresponding to the target object j detected by the roadside sensing apparatus in the $i^{th}$ frame and a vehicle result unit corresponding to the target object j detected by the vehicle sensing apparatus in the $i^{th}$ frame. The second matching result is an interframe matching result of the vehicle sensing apparatus, that is, a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame. The third matching result is an intraframe matching result of the $(i+1)^{th}$ frame, that is, a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame. The fourth matching result is an interframe matching result of the roadside sensing apparatus, that is, a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In this embodiment of this application, the multiframe correlation is mainly obtained based on interframe loopback between a plurality of consecutive frames. In one embodiment, the multiframe correlation may be defined as $T_{multiframe}=T_{loopback12}+T_{loopbacic23}+T_{loopback34}+\ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . , and so on.

S106. The vehicle device fuses the vehicle sensing data and the roadside sensing data by using a fusion formula, to obtain a first fusion result.

In this embodiment of this application, the vehicle device may perform, by using the fusion formula, data fusion on the roadside sensing data detected by the roadside sensing apparatus in the sensing range and the vehicle sensing data detected by the vehicle sensing apparatus in the sensing range, to obtain the first fusion result.

In this embodiment of this application, the fusion formula may be expressed as $y=f(result_r, result_v)$, where $result_r$ is a roadside result set, $result_v$ is a vehicle result set, y is the first fusion result, and f is used to obtain the first fusion result by mapping based on the roadside result set and the vehicle result set.

In one embodiment, the function f may be expressed as:

$$f(result_r, result_v) = \frac{w_r}{w_r + w_v}result_r + \frac{w_v}{w_r + w_v}result_v,$$

where $w_r$ is a confidence factor of the roadside sensing apparatus, $w_r$ may be multidimensional data, that is, $w_r=(w_{r1}, w_{r2}, \ldots, w_{rM})$, $result_r$ $(roadside_1, roadside_2, \ldots, roadside_M)$, M is a quantity of target objects in the sensing range of the roadside sensing apparatus, $w_{ri}$ is a confidence factor corresponding to the target object i in the sensing range of the roadside sensing apparatus, $roadside_i$ is the roadside result unit corresponding to the target object i in the sensing range of the roadside sensing apparatus, i is a natural number less than M, $w_v$ is a confidence factor of the vehicle sensing apparatus, $w_v$ may be multidimensional data, that is, $w_v=(w_{v1}, w_{v2}, \ldots, w_{vN})$, N is a quantity of target objects in the sensing range of the vehicle sensing apparatus, $w_{vj}$ is a confidence factor corresponding to the target object j in the sensing range of the vehicle sensing apparatus, $vehicle_j$ is the vehicle result unit corresponding to the target object j in the sensing range of the vehicle sensing apparatus, and j is a natural number less than N.

For brevity, fusion of the roadside sensing data and the vehicle sensing data is not described in detail again in this embodiment of this application. For details, refer to the descriptions about fusion of the roadside sensing data and the vehicle sensing data at the beginning of the specification.

Figure 9:
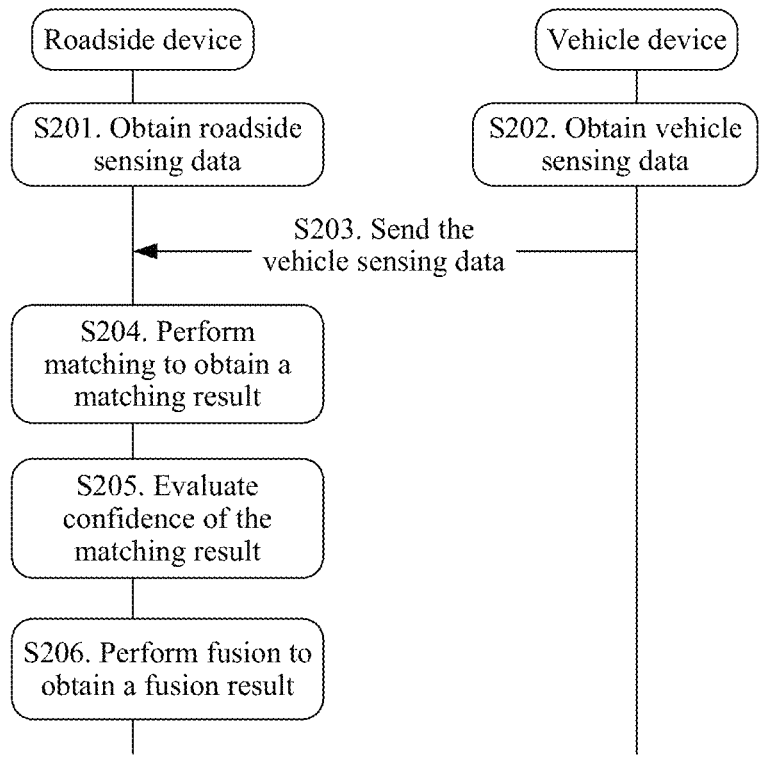
FIG. 9 is a schematic flowchart of a second data fusion method according to an embodiment of this application.

FIG. 9 is a schematic flowchart of a second data fusion method according to an embodiment of this application. As shown in FIG. 9, the data fusion method in this embodiment of this application includes the following operations:

S201. A roadside device obtains roadside sensing data, where the roadside sensing data is obtained by a roadside sensing apparatus by sensing a road environment in a sensing range by using a roadside sensor.

In this embodiment of this application, the roadside sensing apparatus may be configured for the roadside device. The roadside sensing apparatus includes at least one roadside sensor, for example, a microwave radar and a millimeter-wave radar, and can identify roadside sensing data of a target object in the sensing range. The roadside sensing data may include a position, a speed, a size, a color, and the like of the target object.

It may be understood that, the foregoing several examples are only examples of the roadside sensor, and should not constitute a limitation. The roadside sensing apparatus may use any one of the roadside sensors alone, or may use any plurality of the roadside sensors simultaneously.

S202. A vehicle device obtains vehicle sensing data, where the vehicle sensing data is obtained by a vehicle sensing apparatus by sensing a road environment in a sensing range by using a vehicle sensor.

In this embodiment of this application, the vehicle sensing apparatus may be configured for the vehicle device. The vehicle sensing apparatus includes at least one vehicle sensor, for example, a combined inertial navigation, a microwave radar, a millimeter-wave radar, and a camera, and can identify vehicle sensing data of a target object in the sensing range. The vehicle sensing data may include a position, a speed, a size, a color, and the like of the target object.

It may be understood that, the foregoing several examples are only examples of the vehicle sensor, and should not constitute a limitation. The vehicle sensing apparatus may use any one of the vehicle sensors alone, or may use any plurality of the vehicle sensors simultaneously.

S203. The vehicle device sends the vehicle sensing data to the roadside device. Correspondingly, the roadside device receives the vehicle sensing data sent by the vehicle device.

S204. The roadside device matches the roadside sensing data with the vehicle sensing data to obtain a matching result.

In this embodiment of this application, the roadside sensing apparatus may find out a matching relationship between a roadside result unit in the roadside sensing data and a vehicle result unit in the vehicle sensing data by using a deviation network. In one embodiment, the roadside result unit and the vehicle result unit are used as an input of the deviation network. In this case, the deviation network outputs a matching result between the roadside result unit and the vehicle result unit.

In this embodiment of this application, the matching relationship between the roadside result unit in the roadside sensing data and the vehicle result unit in the vehicle sensing data may be found out by using the following formula: $S=Deviation (roadside_i, vehicle_j)$, where S is a matching result, Deviation is the deviation network, $roadside_i$ is a roadside result unit corresponding to a target object i in the sensing range of the roadside sensing apparatus, $vehicle_j$ is a vehicle result unit corresponding to a target object j in the sensing range of the vehicle sensing apparatus, and both i and j are natural numbers.

S205. The roadside device evaluates confidence of the matching result in a manner of interframe loopback and/or multiframe correlation to obtain an evaluation result, and adjusts the deviation network based on the evaluation result.

In this embodiment of this application, the interframe loopback may be defined as: $T_{loopback}=T_1+T_2+T_3+T_4$, where $T_{loopback}$ is the interframe loopback, $T_1$ is a first matching result, $T_2$ is a second matching result, $T_3$ is a third matching result, and $T_4$ is a fourth matching result. The first matching result is an intraframe matching result of an $i^{th}$ frame, that is, a matching result between a roadside result unit corresponding to the target object j detected by the roadside sensing apparatus in the $i^{th}$ frame and a vehicle result unit corresponding to the target object j detected by the vehicle sensing apparatus in the $i^{th}$ frame. The second matching result is an interframe matching result of the vehicle sensing apparatus, that is, a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame. The third matching result is an intraframe matching result of the $(i+1)^{th}$ frame, that is, a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame. The fourth matching result is an interframe matching result of the roadside sensing apparatus, that is, a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In this embodiment of this application, the multiframe correlation is mainly obtained based on interframe loopback between a plurality of consecutive frames. In one embodiment, the multiframe correlation may be defined as $T_{multiframe}=T_{loopback12}+T_{loopback23}+T_{loopback34}+\ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . , and so on.

S206. The roadside device fuses the vehicle sensing data and the roadside sensing data by using a fusion formula, to obtain a first fusion result.

In this embodiment of this application, the roadside sensing apparatus may perform, by using the fusion formula, data fusion on the roadside sensing data detected by the roadside sensing apparatus in the sensing range and the vehicle sensing data detected by the vehicle sensing apparatus in the sensing range, to obtain the first fusion result.

In this embodiment of this application, the fusion formula may be expressed as $y=f(result_r, result_v)$, where $result_r$ is a roadside result set, $result_v$ is a vehicle result set, y is the first fusion result, and f is used to obtain the first fusion result by mapping based on the roadside result set and the vehicle result set.

In one embodiment, the function f may be expressed as:

$$f(result_r, result_v) = \frac{w_r}{w_r + w_v}result_r + \frac{w_v}{w_r + w_v}result_v,$$

where $w_r$ is a confidence factor of the roadside sensing apparatus, $w_r$ may be multidimensional data, that is, $w_r=(w_{r1}, w_{r2}, \ldots, w_{rM})$, $result_r$ ($roadside_1, roadside_2, \ldots, roadside_M$), M is a quantity of target objects in the sensing range of the roadside sensing apparatus, $w_{ri}$ is a confidence factor corresponding to the target object i in the sensing range of the roadside sensing apparatus, $roadside_i$ is the roadside result unit corresponding to the target object i in the sensing range of the roadside sensing apparatus, i is a natural number less than M, $w_v$ is a confidence factor of the vehicle sensing apparatus, $w_v$ may be multidimensional data, that is, $w_v=(w_{v1}, w_{v2}, \ldots, w_{vN})$, N is a quantity of target objects in the sensing range of the vehicle sensing apparatus, $w_{vj}$ is a confidence factor corresponding to the target object j in the sensing range of the vehicle sensing apparatus, $vehicle_j$ is the vehicle result unit corresponding to the target object j in the sensing range of the vehicle sensing apparatus, and j is a natural number less than N.

For brevity, fusion of the roadside sensing data and the vehicle sensing data is not described in detail again in this embodiment of this application. For details, refer to the descriptions about fusion of the roadside sensing data and the vehicle sensing data at the beginning of the specification.

Figure 10:
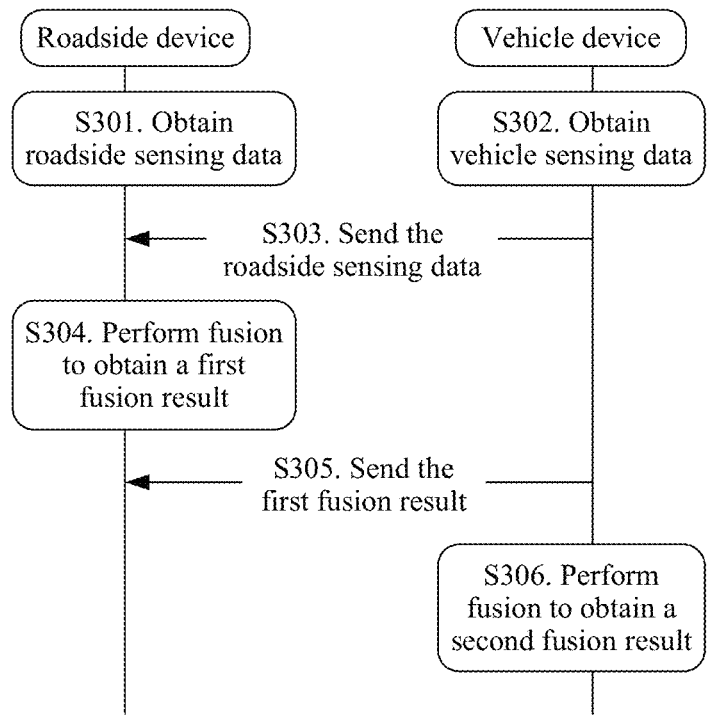
FIG. 10 is a schematic flowchart of a third data fusion method according to an embodiment of this application.

FIG. 10 is a schematic flowchart of a third data fusion method according to an embodiment of this application. As shown in FIG. 10, the data fusion method in this embodiment of this application includes the following operations:

S301. A roadside device obtains roadside sensing data, where the roadside sensing data is obtained by a roadside sensing apparatus by sensing a road environment in a sensing range by using a roadside sensor.

In this embodiment of this application, the roadside sensing apparatus may be configured for the roadside device. The roadside sensing apparatus includes at least one roadside sensor, for example, a microwave radar and a millimeter-wave radar, and can identify roadside sensing data of a target object in the sensing range. The roadside sensing data may include a position, a speed, a size, a color, and the like of the target object.

It may be understood that, the foregoing several examples are only examples of the roadside sensor, and should not constitute a limitation. The roadside sensing apparatus may use any one of the roadside sensors alone, or may use any plurality of the roadside sensors simultaneously.

S302. At least one vehicle device obtains vehicle sensing data, where the vehicle sensing data is obtained by a vehicle sensing apparatus by sensing a road environment in a sensing range by using a vehicle sensor.

In this embodiment of this application, the vehicle sensing apparatus may be configured for the vehicle device. The vehicle sensing apparatus includes at least one vehicle sensor, for example, a combined inertial navigation, a microwave radar, a millimeter-wave radar, and a camera, and can identify vehicle sensing data of a target object in the sensing range. The vehicle sensing data may include a position, a speed, a size, a color, and the like of the target object.

It may be understood that, the foregoing several examples are only examples of the vehicle sensor, and should not constitute a limitation. The vehicle sensing apparatus may use any one of the vehicle sensors alone, or may use any plurality of the vehicle sensors simultaneously.

S303. The at least one vehicle device sends the vehicle sensing data to the roadside device. Correspondingly, the roadside device receives the vehicle sensing data sent by the at least one vehicle device.

S304. The roadside device matches the roadside sensing data with the vehicle sensing data sent by the at least one vehicle device, to obtain a matching result.

In this embodiment of this application, the roadside device may find out a matching relationship between a roadside result unit in the roadside sensing data and a vehicle result unit in the vehicle sensing data by using a deviation network. In one embodiment, the roadside result unit and the vehicle result unit are used as an input of the deviation network. In this case, the deviation network outputs a matching result between the roadside result unit and the vehicle result unit.

In this embodiment of this application, the matching relationship between the roadside result unit in the roadside sensing data and the vehicle result unit in the vehicle sensing data may be found out by using the following formula: S=Deviation (roadside$_i$, vehicle$_j$), where S is a matching result, Deviation is the deviation network, roadside$_i$ is a roadside result unit corresponding to a target object i in the sensing range of the roadside sensing apparatus, vehicle$_j$ is a vehicle result unit corresponding to a target object j in the sensing range of the vehicle sensing apparatus, and both i and j are natural numbers.

S305. The roadside device evaluates confidence of the matching result in a manner of interframe loopback and/or multiframe correlation to obtain an evaluation result, and adjusts the deviation network based on the evaluation result.

In this embodiment of this application, the interframe loopback may be defined as: $T_{loopback}=T_1+T_2+T_3+T_4$, where $T_{loopback}$ is the interframe loopback, $T_1$ is a first matching result, $T_2$ is a second matching result, $T_3$ is a third matching result, and $T_4$ is a fourth matching result. The first matching result is an intraframe matching result of an $i^{th}$ frame, that is, a matching result between a roadside result unit corresponding to the target object j detected by the roadside sensing apparatus in the $i^{th}$ frame and a vehicle result unit corresponding to the target object j detected by the vehicle sensing apparatus in the $i^{th}$ frame. The second matching result is an interframe matching result of the vehicle sensing apparatus, that is, a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame. The third matching result is an intraframe matching result of the $(i+1)^{th}$ frame, that is, a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame. The fourth matching result is an interframe matching result of the roadside sensing apparatus, that is, a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In this embodiment of this application, the multiframe correlation is mainly obtained based on interframe loopback between a plurality of consecutive frames. In one embodiment, the multiframe correlation may be defined as $T_{multiframe}=T_{loopback12}+T_{loopback23}+T_{loopback34}+\ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . , and so on.

S306. The roadside device fuses the vehicle sensing data sent by the at least one vehicle device and the roadside sensing data by using a fusion formula, to obtain a first fusion result.

In this embodiment of this application, the roadside device may perform, by using the fusion formula, data fusion on the roadside sensing data detected by the roadside sensing apparatus in the sensing range and the vehicle sensing data detected by the vehicle sensing apparatus in the sensing range, to obtain the first fusion result.

In this embodiment of this application, the fusion formula may be expressed as y=f(result$_r$, result$_v$), where result$_r$ is a roadside result set, result$_v$ is a vehicle result set, y is the first fusion result, and f is used to obtain the first fusion result by mapping based on the roadside result set and the vehicle result set.

In one embodiment, the function f may be expressed as:

$$f(\text{result}_r, \text{result}_v) = \frac{w_r}{w_r+w_v}\text{result}_r + \frac{w_v}{w_r+w_v}\text{result}_v,$$

where $w_r$ is a confidence factor of the roadside sensing apparatus, $w_r$ may be multidimensional data, that is, $w_r=(w_{r1}, w_{r2}, \ldots, w_{rM})$, result$_r$ (roadside$_1$, roadside$_2$, . . . , roadside$_M$), M is a quantity of target objects in the sensing range of the roadside sensing apparatus, $w_{ri}$ is a confidence factor corresponding to the target object i in the sensing range of the roadside sensing apparatus, roadside$_i$ is the roadside result unit corresponding to the target object i in the sensing range of the roadside sensing apparatus, i is a natural number less than M, $w_v$ is a confidence factor of the vehicle sensing apparatus, $w_v$ may be multidimensional data, that is, $w_v=(w_{v1}, w_{v2}, \ldots, w_{vN})$, N is a quantity of target objects in the sensing range of the vehicle sensing apparatus, $w_{vj}$ is a confidence factor corresponding to the target object j in the sensing range of the vehicle sensing apparatus, vehicle$_j$ is the vehicle result unit corresponding to the target object j in the sensing range of the vehicle sensing apparatus, and j is a natural number less than N.

In this embodiment of this application, the first fusion result may be obtained by the roadside sensing apparatus by fusing vehicle sensing data sent by one or more vehicle sensing apparatuses and the roadside sensing data of the roadside sensing apparatus by using the fusion formula. This is not specifically limited.

For brevity, fusion of the roadside sensing data and the vehicle sensing data is not described in detail again in this embodiment of this application. For details, refer to the descriptions about fusion of the roadside sensing data and the vehicle sensing data at the beginning of the specification.

S307. The roadside device sends the first fusion result to a target vehicle device. Correspondingly, the target vehicle device receives the first fusion result sent by the roadside device. The target vehicle device belongs to the at least one vehicle device.

S308. The target vehicle device fuses the first fusion result and vehicle sensing data of the target vehicle device to obtain a second fusion result.

In this embodiment of this application, the target vehicle device may perform data fusion on the first fusion result and the vehicle sensing data of the target vehicle device by using a fusion formula, to obtain the second fusion result. The process of fusing the first fusion result and the vehicle sensing data is similar to the process of fusing the roadside sensing data and the vehicle sensing data, and is not described again herein.

In the foregoing solution, the roadside device may fuse the vehicle sensing data sent by the plurality of vehicle sensing apparatuses and the roadside sensing data of the roadside device to obtain the first fusion result with a wider sensing range (the sensing range herein is a result of overlapping between the sensing range of the roadside sensing apparatus and sensing ranges of the plurality of vehicle sensing apparatuses), and then send the first fusion result to the target vehicle device, so that the target vehicle device fuses the first fusion result and the vehicle sensing data to extend the sensing range of the vehicle sensing apparatus.

Based on a same inventive concept, an embodiment of this application provides a fusion apparatus, where the device may be applied to a vehicle device, or may be applied to a roadside device. The fusion apparatus may be a chip, a programmable component, a circuit component, a device (that is, the fusion apparatus is a vehicle device or a roadside device), a system, or the like, and is not limited herein.

Figure 11:
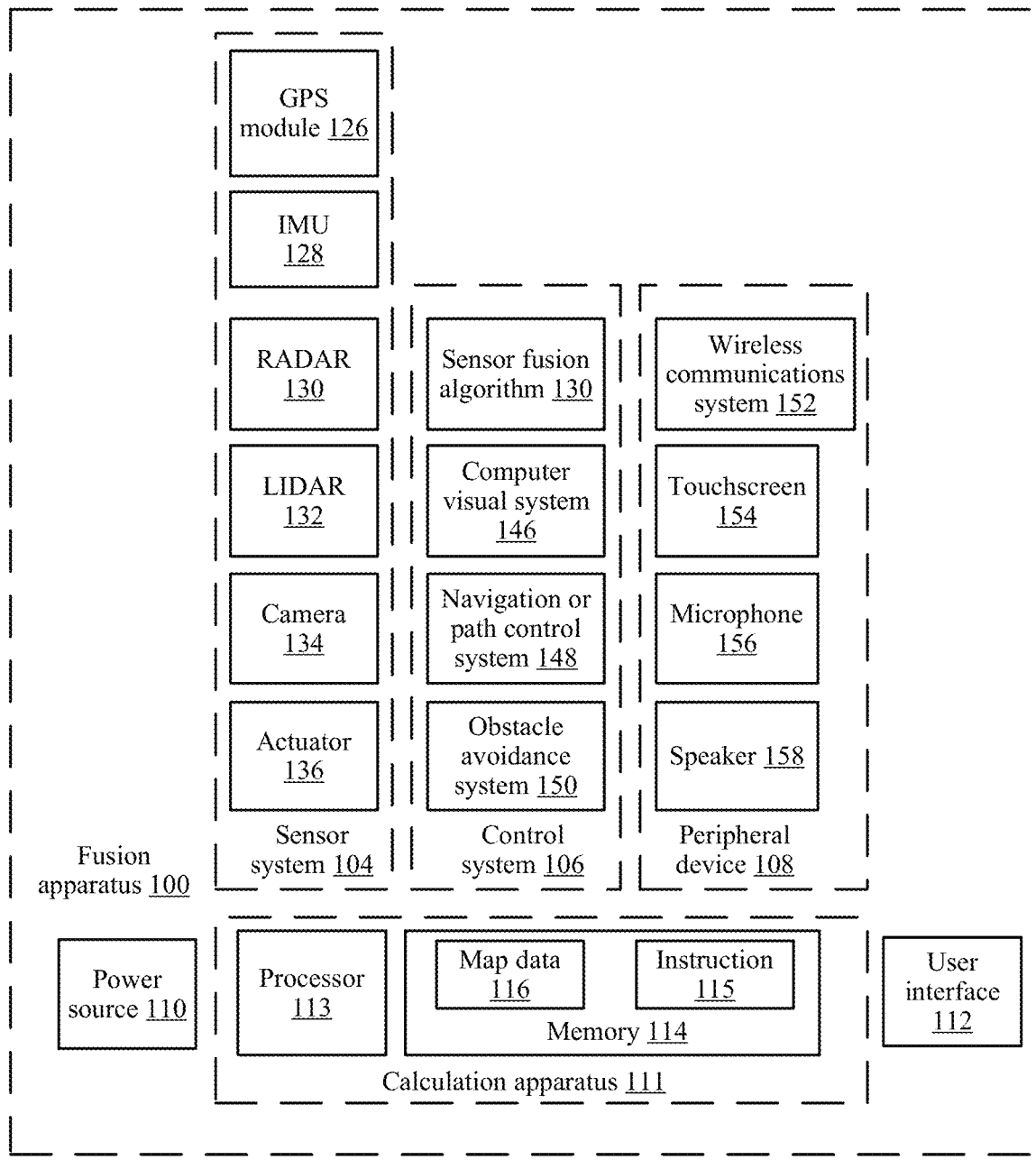
FIG. 11 to FIG. 14 are schematic structural diagrams of four fusion apparatuses according to an embodiment of this application.

As shown in FIG. 11, in an example in which the fusion apparatus is a vehicle device, the fusion apparatus 100 includes a sensor system 104, a control system 106, a peripheral device 108, a power source 110, and a calculation apparatus 112. The calculation apparatus 112 may include a processor 113 and a memory 114. The calculation apparatus 112 may be a controller of the fusion apparatus 100 or a part of a controller. The memory 114 may include an instruction 115 that may be run by the processor 113, and may further store map data 116. Components of the fusion apparatus 100 may be configured to work in a manner of interconnection with each other and/or interconnection with other components coupled to various systems. For example, the power source 110 may supply power for all components of the fusion apparatus 100. The calculation apparatus 111 may be configured to receive data from the sensor system 104, the control system 106, and the peripheral device 108, and control them.

In other examples, the fusion apparatus 100 may include more, fewer, or different systems, and each system may include more, fewer, or different components. In addition, the shown systems and components may be combined or split in any manner.

The sensor system 104 may include several sensors configured to sense a road environment in a sensing range of the fusion apparatus 100. As shown in the figure, the sensors of the sensor system include a GPS 126, an IMU (inertial measurement unit) 128, a radio detection and radar ranging (RADAR) unit 130, a laser ranging (LIDAR) unit 132, a camera 134, and an actuator 136 configured to change a position and/or an orientation of a sensor.

The GPS module 126 may be any sensor configured to estimate a geographical position of a vehicle. Therefore, the GPS module 126 may include a transceiver, and estimate a position of the fusion apparatus 100 relative to the earth based on satellite positioning data. In an example, by using the GPS module 126 and referring to the map data 116, the calculation apparatus 111 may be configured to estimate a position of the fusion apparatus 100 at a lane edge on a road on which the vehicle device can drive. Alternatively, the GPS module 126 may be in another form.

The IMU 128 may be configured to sense position and orientation changes of the vehicle based on inertial, acceleration, and any combination thereof. In some examples, a combination of sensors may include an accelerometer and a gyro. Other combinations of sensors are also possible.

The RADAR unit 130 may be considered as an object detection system. The RADAR unit 130 is configured to use a radio wave to detect a feature of a target object, for example, a distance, a height, a direction, or a speed of an object. The RADAR unit 130 may be configured to transmit a radio wave or a microwave pulse. The radio wave or the microwave pulse may be reflected by any object in a path of the wave. The object may return a part of energy of the wave to a receiver (for example, a dish antenna or an antenna), and the receiver may also be a part of the RADAR unit 130. The RADAR unit 130 may be further configured to perform digital signal processing on a received signal (reflected from an object), and may be configured to identify a target object.

Other systems similar to a RADAR are already used in other parts of an electromagnetic spectrum. An example is a LIDAR (light detection and ranging), which may use visible light from a laser instead of a radio wave.

The LIDAR unit 132 includes a sensor, where the sensor uses light to sense or detect a target object in the road environment in the sensing range of the fusion apparatus 100. Generally, the LIDAR is an optical remote sensing technology that may use light to illuminate a target to measure a distance to a target object or other attributes of the target object. For example, the LIDAR unit 132 may include a laser source and/or a laser scanner configured to transmit a laser pulse, and a detector configured to receive reflection of the laser pulse. For example, the LIDAR unit 132 may include a laser rangefinder based on reflection by a rotation mirror, and perform laser scanning around a digital scene in one dimension or two dimensions, to collect distance measurement values from a specified angle at specified intervals. In an example, the LIDAR unit 132 may include components such as a light (for example, laser) source, a scanner, an optical system, an optical detector, and a receiver or an electronic component, and a position and navigation system.

In an example, the LIDAR unit 132 may be configured to use ultraviolet (UV), visible light, or infrared light for object imaging, and may be applied to a wide range of target objects, including non-metallic objects. In an example, a narrow laser beam may be used to draw a map about physical features of an object with a high resolution.

In an example, wavelengths in a range from about 10 microns (infrared) to about 250 nanometers (UV) may be used. Light is generally reflected after backscattering. Different types of scattering, for example, Rayleigh scattering, Mie scattering, Raman scattering, and fluorescent, are used in different LIDAR applications. For example, based on different types of backscattering, the LIDAR may be therefore referred to as a Rayleigh laser RADAR, a Mie LIDAR, a Raman LIDAR, and a sodium/Fe/potassium fluorescent LIDAR. An appropriate combination of wavelengths may allow, for example, remote map drawing for an object by searching for a wavelength-dependent change of strength of a reflected signal.

Three-dimensional (3D) imaging may be implemented by using a scanning LIDAR system and a non-scanning LIDAR system. "A 3D gated viewing laser RADAR (3D gated viewing laser radar)" is an example of a non-scanning laser ranging system. A pulsed laser and a fast gated camera are applied in the 3D gated viewing laser RADAR. An imaging LIDAR may also be implemented by using a high-speed detector array and a modulation sensitive detector array built on a single chip generally by using CMOS (Complementary Metal Oxide Semiconductor) and CCD (Charge Coupled Device) fabrication techniques. In the apparatuses, each pixel may be locally processed through high-speed demodulation or gating, so that the array can be processed to represent an image from a camera. This technology can be used to simultaneously obtain thousands of pixels to create a 3D point cloud representing an object or a scene detected by the LIDAR unit 132.

The point cloud may include a group of vertices in a 3D coordinate system. The vertices may be defined, for example, by X, Y, and Z coordinates, and may represent an outer surface of a target object. The LIDAR unit 132 may be configured to create a point cloud by measuring a large quantity of points on the surface of the target object, and may use the point cloud as a data file for outputting. As a result of a 3D scanning process performed on the object by using the LIDAR unit 132, the point cloud may be used to identify and visualize the target object.

In an example, the point cloud may be directly rendered to visualize the target object. In another example, the point cloud may be converted into a polygonal or triangular grid model in a process that may be referred to as surface reconstruction. Example technologies for converting the point cloud into a 3D surface may include: Delaunay triangulation, alpha shape, and rotating sphere. The technologies include constructing a triangular network on the existing vertices of the point cloud. Other example technologies may include converting the point cloud into a volume distance field, and reconstructing, by using a marching cubes algorithm, an implicit surface defined in this manner.

The camera 134 may be any camera (for example, a static camera or a video camera) configured to obtain an image of the road environment in which the vehicle is located. Therefore, the camera may be configured to detect visible light, or may be configured to detect light from other parts of spectrums (for example, infrared light or ultraviolet). Other types of cameras are also possible. The camera 134 may be a two-dimensional detector, or may have a three-dimensional space range. In some examples, the camera 134 may be, for example, a distance detector, and the camera 134 is configured to generate a two-dimensional image indicating distances from the camera 134 to several points in the environment. Therefore, the camera 134 may use one or more distance detection technologies. For example, the camera 134 may be configured to use a structured light technology. The fusion apparatus 100 uses a predetermined light pattern, for example, a grid or chessboard grid pattern, to illuminate an object in the environment, and uses the camera 134 to detect reflection of the predetermined light pattern from the object. Based on distortion in the reflected light pattern, the fusion apparatus 100 may be configured to detect a distance to a point on the object. The predetermined light pattern may include infrared light or light of other wavelengths.

The actuator 136, for example, may be configured to change a position and/or an orientation of a sensor. The sensor system 104 may additionally or alternatively include a component other than the shown components.

The control system 106 may be configured to control operations of the fusion apparatus 100 and components of the fusion apparatus 100. Therefore, the control system 106 may include a sensor fusion algorithm 144, a computer visual system 146, a navigation or path control (pathing) system 148, and an obstacle avoidance system 150.

The sensor fusion algorithm 144 may include, for example, an algorithm (or a computer program product storing an algorithm) that the calculation apparatus 111 may run. The sensor fusion algorithm 144 may be configured to accept data from the sensor 104 as an input. The data may include, for example, data of information detected by a sensor of the sensor system 104. The sensor fusion algorithm 144 may include, for example, a Kalman filter, a Bayesian network, or another algorithm. The sensor fusion algorithm 144 may be further configured to provide various evaluations based on data from the sensor system 104, including, for example, an evaluation on an individual object and/or feature in the environment in which the vehicle is located, an evaluation on a specific situation, and/or an evaluation on possible impact based on a specific situation. Other evaluations are also possible.

The computer visual system 146 may be any system configured to process and analyze an image captured by the camera 134, to identify an object and/or a feature in the environment in which the fusion apparatus 100 is located, where the object and/or feature include/includes, for example, lane information, a traffic signal, and an obstacle. Therefore, the computer visual system 146 may use an object identification algorithm, a structure from motion (SFM) algorithm, video tracking, or another computer visual technology. In some examples, the computer visual system 146 may be additionally configured to draw an environment map, follow an object, estimate a speed of the object, and the like.

The navigation and path control system 148 may be any system configured to determine a driving path of the vehicle. The navigation and path control system 148 may be additionally configured to dynamically update the driving path when the vehicle is in an operation. In some examples, the navigation and path control system 148 may be configured to determine the driving path for the vehicle with reference to data from the sensor fusion algorithm 144, the GPS module 126, and one or more predetermined maps.

The obstacle avoidance system 150 may be any system configured to identify, evaluate, and avoid, or overtake in another manner, an obstacle in the environment in which the vehicle is located.

The control system 106 may additionally or alternatively include a component other than the shown components.

The peripheral device 108 may be configured to allow the fusion apparatus 100 to interact with an external sensor, another vehicle, and/or a user. Therefore, the peripheral device 108 may include, for example, a wireless communications system 152, a touchscreen 154, a microphone 156, and/or a speaker 158.

The wireless communications system 152 may be any system configured to couple to one or more other vehicles, a sensor, or another entity directly or by using a communications network in a wireless manner. Therefore, the wireless communications system 152 may include an antenna and a chip set configured to communicate with the another vehicle, the sensor, or the another entity directly or by using an air interface. The chip set or the entire wireless communications system 152 may be configured to communicate based on one or more other types of wireless communication (for example, protocols), where the wireless communication is, for example, Bluetooth, a communication protocol described in IEEE 802.11 (including any IEEE 802.11 revision), a cellular technology (for example, GSM, CDMA, UMTS (universal mobile telecommunications system), EV-DO, WiMAX, or LTE (long term evolution), ZigBee, DSRC (dedicated short range communications), RFID (radio frequency identification), and the like. The wireless communications system 152 may also be in another form.

The touchscreen 154 may be used by the user to input a command to the fusion apparatus 100. Therefore, the touchscreen 154 may be configured to sense at least one of a position and motion of a finger of the user through capacitive sensing, resistive sensing, a surface acoustic wave process, or the like. The touchscreen 154 can sense the motion of the finger in a direction that is parallel to a surface of the touchscreen or is in a same plane as a surface of the touchscreen, in a direction vertical to a surface of the touchscreen, or in both directions, and can further sense a level of pressure applied to the surface of the touchscreen. The touchscreen 154 may include one or more translucent or transparent insulating layers and one or more translucent or transparent conducting layers. The touchscreen 154 may also be in another form.

The microphone 156 may be configured to receive an audio (for example, a voice command or another audio input) from the user of the fusion apparatus 100. Similarly, the speaker 158 may be configured to output an audio to the user of the fusion apparatus 100.

The peripheral device 108 may additionally or alternatively include a component other than the shown components.

The power source 110 may be configured to supply power for some or all of components of the fusion apparatus 100. Therefore, the power source 110 may include, for example, a rechargeable lithium-ion or lead-acid battery. In some examples, one or more battery groups may be configured to supply power. Other power materials and configurations are also possible. In some examples, the power source 110 and an energy source 120 may be implemented together, as in an electric vehicle.

The processor 113 included in the calculation apparatus 111 may include one or more general purpose processors and/or one or more dedicated processors (for example, an image processor or a digital signal processor). If the processor 113 includes more than one processor, the processors may work independently or work in combination. The calculation apparatus 111 may implement a function of controlling the vehicle 100 based on an input received by using a user interface 112.

The memory 114 may further include one or more volatile storage components and/or one or more non-volatile storage components, such as an optical, magnetic, and/or organic storage apparatus, and the memory 114 may be integrated with the processor 113 completely or partially. The memory 114 may include an instruction 115 (for example, program logic) that is run by the processor 113, to run various vehicle functions, including any one of the functions or methods described in the specification.

The components of the fusion apparatus 100 may be configured to work in a manner of interconnection with other components in respective systems and/or interconnection with other external components. Therefore, the components and systems of the fusion apparatus 100 may be communicatively interconnected by using a system bus, a network, and/or another connection mechanism.

In Embodiment 1, the processor 113 of the fusion apparatus 100 executes the following instruction:

obtaining vehicle sensing data, where the vehicle sensing data is obtained by a vehicle sensing apparatus by sensing a road environment in a sensing range;

obtaining roadside sensing data, where the roadside sensing data is obtained by a roadside sensing apparatus by sensing a road environment in a sensing range; and fusing the vehicle sensing data and the roadside sensing data by using a fusion formula, to obtain a first fusion result.

In Embodiment 2, the processor 113 of the fusion apparatus 100 executes the following instruction:

sending vehicle sensing data to a roadside device, where the vehicle sensing data is obtained by a vehicle sensing apparatus by sensing a road environment in a sensing range by using a vehicle sensor;

receiving a first fusion result sent by the roadside device, where the first fusion result is obtained by the roadside device by fusing vehicle sensing data of at least one vehicle device and roadside sensing data by using a fusion formula, and the roadside sensing data is obtained by a roadside sensing apparatus by sensing a road environment in a sensing range; and fusing the vehicle sensing data and the first fusion result to obtain a second fusion result.

With reference to Embodiment 1 or Embodiment 2, the fusion formula is expressed as:

$$y = f(\text{result}_r, \text{result}_v),$$

where $\text{result}_r$ is a roadside result set, the roadside result set is used to indicate the roadside sensing data, $\text{result}_v$ is a vehicle result set, the vehicle result set is used to indicate the vehicle sensing data, y is the first fusion result, and the function f is used to obtain the first fusion result by mapping based on the roadside result set and the vehicle result set.

In one embodiment, $$f(\text{result}_r, \text{result}_v) = \frac{w_r}{w_r + w_v}\text{result}_r + \frac{w_v}{w_r + w_v}\text{result}_v,$$

where $w_r$ is a confidence factor of the roadside sensing apparatus, $w_r = (w_{r1}, w_{r2}, \ldots, w_{rM})$, $\text{result}_r$ (roadside$_1$, roadside$_2$, ..., roadside$_M$), M is a quantity of target objects in the sensing range of the roadside sensing apparatus, $w_{ri}$ is a confidence factor corresponding to a target object i in the sensing range of the roadside sensing apparatus, roadside$_i$ is a roadside result unit corresponding to the target object i in the sensing range of the roadside sensing apparatus, i is a natural number, $0 < i \le M$, $w_v$ is a confidence factor of the vehicle sensing apparatus, $w_v = (w_{v1}, w_{v2}, \ldots, w_{vN})$, $\text{result}_v$ (vehicle$_1$, vehicle$_2$, ..., vehicle$_N$), N is a quantity of target objects in the sensing range of the vehicle sensing apparatus, $w_{vj}$ is a confidence factor corresponding to a target object j in the sensing range of the vehicle sensing apparatus, vehicle$_j$ is a vehicle result unit corresponding to the target object j in the sensing range of the vehicle sensing apparatus, j is a natural number, and $0 < j \le N$.

In one embodiment, the confidence factor is determined based on a sensing apparatus parameter, a sensing distance of the target object, and a sensing angle of the target object together.

For example, the confidence factor w may be obtained based on the following formula:

$$w = g(S_k, R_i, \theta_j), w \in [0,1],$$

where $S_k$ is the sensing apparatus parameter, $R_i$ is the sensing distance of the target object, $\theta_j$ is the sensing angle of the target object, and g is a calibration parameter table obtained through calibration of a sensing apparatus.

In one embodiment, the vehicle result set includes at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

In one embodiment, one vehicle result unit in the at least one vehicle result unit is expressed as vehicle$_j$ ($p_{vj}$, $v_{vj}$, $s_{vj}$, $c_{vj}$), where $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the sensing range of the vehicle sensing apparatus, j is a natural number, and $0 < j \le N$.

In one embodiment, the roadside result set includes at least one roadside result unit, a one-to-one correspondence exists between the at least one roadside result unit and at least one target object, and each roadside result unit in the at least one roadside result unit is used to describe a feature of a corresponding target object from a multidimensional angle.

In one embodiment, one roadside result unit in the at least one roadside result unit is expressed as roadside$_i$ ($p_{vi}$, $v_{vi}$, $s_{vi}$, $c_{vi}$), where $p_{vi}$ indicates a position of the target object i detected by the roadside sensing apparatus, $v_{vi}$ indicates a speed of the target object i detected by the roadside sensing apparatus, $s_{vi}$ indicates a size of the target object i detected by the roadside sensing apparatus, $c_{vi}$ indicates a color of the target object i detected by the roadside sensing apparatus, M is the quantity of target objects in the sensing range of the roadside sensing apparatus, i is a natural number, and $0 < i \leq M$.

With reference to Embodiment 1 or Embodiment 2, before the fusing the vehicle sensing data and the roadside sensing data by using a fusion formula, to obtain a first fusion result, the method includes: matching the roadside sensing data with the vehicle sensing data to obtain a matching result; and fusing the vehicle sensing data and the roadside sensing data based on the matching result, to obtain the first fusion result.

In one embodiment, a matching relationship between a roadside result unit in the roadside result set and a vehicle result unit in the vehicle result set is found out by using a deviation network.

In one embodiment, that a matching relationship between a roadside result unit in the roadside result set and a vehicle result unit in the vehicle result set is found out by using a deviation network includes:

finding out the matching relationship between the roadside result unit in the roadside result set and the vehicle result unit in the vehicle result set by using the following formula: S=Deviation (roadside$_i$, vehicle$_j$), where S is a matching result, Deviation is the deviation network, roadside$_i$ is the roadside result unit corresponding to the target object i in the sensing range of the roadside sensing apparatus, vehicle$_j$ is the vehicle result unit corresponding to the target object j in the sensing range of the vehicle sensing apparatus, and both i and j are natural numbers.

In one embodiment, after the matching the roadside sensing data with the vehicle sensing data to obtain a matching result, the method includes: evaluating confidence of the matching result in a manner of interframe loopback and/or multiframe correlation to obtain an evaluation result; and adjusting the deviation network based on the evaluation result.

In one embodiment, the interframe loopback is $T_{loopback} = T_1 + T_2 + T_3 + T_4$, where $T_{loopback}$ is the interframe loopback, $T_1$ is a first matching result, $T_2$ is a second matching result, $T_3$ is a third matching result, $T_4$ is a fourth matching result, the first matching result is a matching result between a roadside result unit corresponding to the target object j detected by the roadside sensing apparatus in an $i^{th}$ frame and a vehicle result unit corresponding to the target object j detected by the vehicle sensing apparatus in the $i^{th}$ frame, the second matching result is a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame, the third matching result is a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame, and the fourth matching result is a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In one embodiment, the multiframe correlation is defined as $T_{multiframe} = T_{loopback12} + T_{loopback23} + T_{loopback34} + \ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . .

It should be noted that, for content not mentioned in the embodiment in FIG. 11, reference may be made to the embodiments corresponding to FIG. 8 to FIG. 10. Details are not described again herein.

Figure 12:
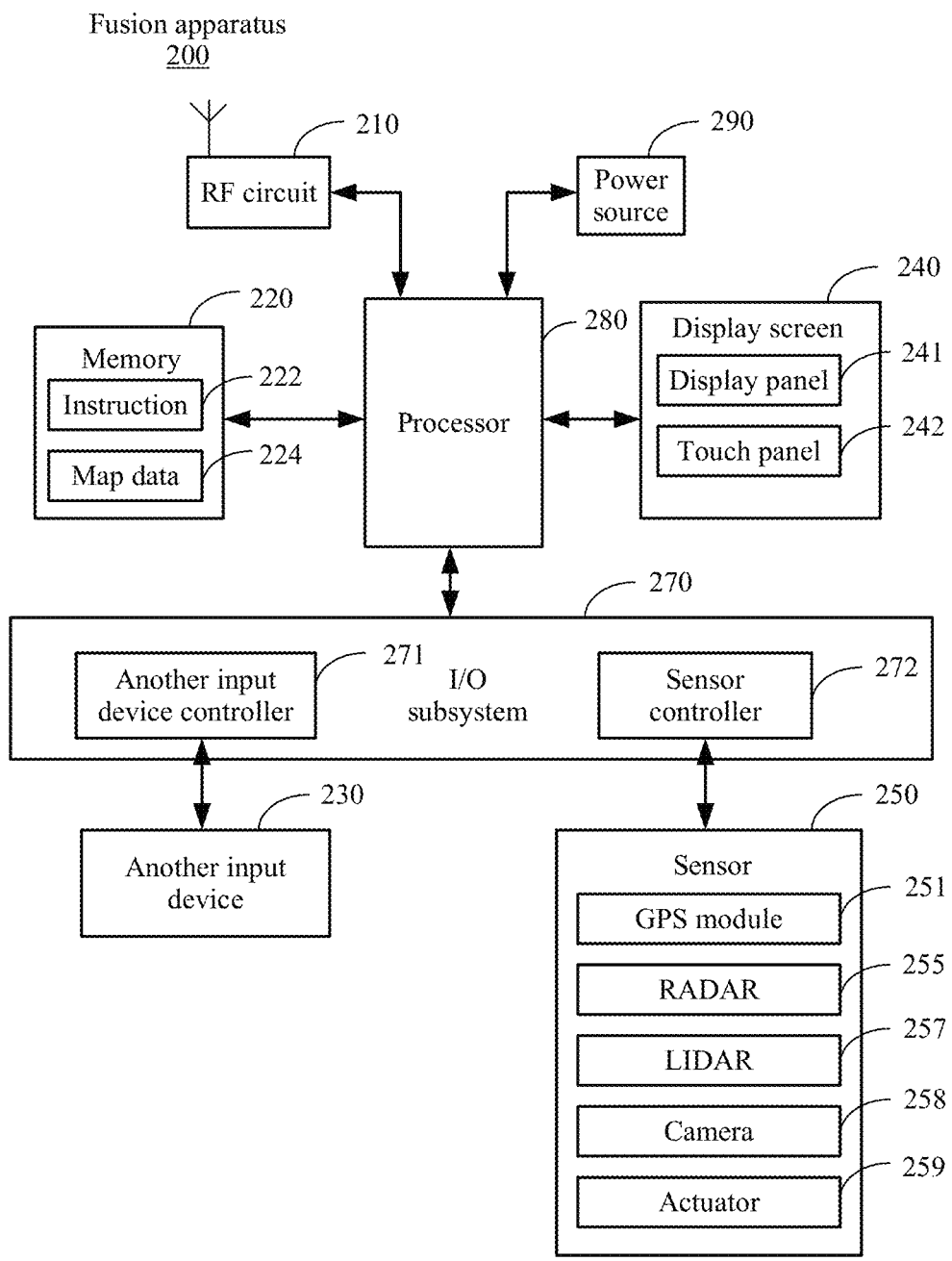

As shown in FIG. 12, for example, when a fusion apparatus is a roadside device, the fusion apparatus 200 includes components such as an RF (radio frequency) circuit 210, a memory 220, another input device 230, a display screen 240, a sensor system 250, an I/O subsystem 270, a processor 280, and a power source 290. A person skilled in the art may understand that a roadside sensing apparatus is not limited to a structure of the roadside sensing apparatus shown in FIG. 12. The roadside sensing apparatus may include more or fewer parts than that shown in the figure, or some parts are combined, or some parts are split, or an arrangement of parts is different. A person skilled in the art may understand that the display screen 240 may be configured to display a user interface (UI).

The following describes each component of the fusion apparatus 200 in detail with reference to FIG. 12.

The RF circuit 210 may be configured to send or receive data. Generally, the RF circuit includes but is not limited to an antenna, at least one amplifier, a transceiver, a coupler, an LNA (low noise amplifier), a duplexer, and the like. In addition, the RF circuit 210 may further communicate with a network and other devices through wireless communication. The wireless communication may use any communication standard or protocol, including but not limited to GSM (global system for mobile communications), GPRS (general packet radio service), CDMA (code division multiple access), WCDMA (wideband code division multiple access), LTE (long term evolution), e-mail, SMS (short message service), and the like.

The memory 220 may include a high-speed random access memory, and may further include a non-volatile memory, for example, at least one magnetic disk storage device, a flash memory, or another volatile solid-state storage device. The memory 220 may include an instruction 222 that may be run by the processor 280, and may further store map data 224.

The another input device 230 may be configured to receive input digit or character information, and generate a key signal input related to a user setting and function control of the fusion apparatus 200. In one embodiment, the another input device 230 may include but is not limited to one or more of a physical keyboard, a function key (such as a volume control key and a power on/off key), a trackball, a mouse, a joystick, an optical mouse (the optical mouse is a touch-sensitive surface that does not display a visual output, or is an extension of a touch-sensitive surface formed by a touchscreen), and the like. The another input device 230 is connected to another input device controller 271 of the I/O subsystem 270, and is controlled by the another input device controller 271 to perform signal interaction with the processor 280.

The display screen 240 may include a display panel 241 and a touch panel 242. For the display panel 241, the display panel 241 may be configured in a form of an LCD (liquid crystal display), an OLED (organic light-emitting diode), or the like. The touch panel 242, also referred to as a touchscreen, a touch-sensitive screen, or the like, may capture a touch or non-touch operation of a user on or near the touch panel (for example, the operation is an operation performed by the user by using any appropriate object or accessory such as a finger or a stylus on the touch panel 242 or near the touch panel 242, or may include a motion sensing operation; and an operation type of the operation includes a single-point control operation, or a multipoint control operation, or the like), and drive a corresponding connection apparatus based on a preset program.

The sensor system 250 may include several sensors configured to sense a road environment in a sensing range of the fusion apparatus 200. As shown in the figure, the sensors of the sensor system include a GPS 251, a radio detection and radar ranging (RADAR) unit 255, a laser ranging (LIDAR) unit 257, a camera 258, and an actuator 259 configured to change a position and/or an orientation of a sensor. The sensor system 250 is connected to a sensor controller 272 of the I/O subsystem 270, and is controlled by the sensor controller 272 to perform interaction with the processor 280.

The GPS module 251 may be any sensor configured to estimate a geographical position of a vehicle. Therefore, the GPS module 251 may include a transceiver, and estimate a position of the fusion apparatus 200 relative to the earth based on satellite positioning data. In an example, the fusion apparatus 200 may be configured to estimate a position of the fusion apparatus 200 on a road by using the GPS module 251 and referring to the map data 224. Alternatively, the GPS module 126 may be in another form.

The RADAR unit 255 may be considered as an object detection system. The RADAR unit 255 is configured to use a radio wave to detect a feature of a target object, for example, a distance, a height, a direction, or a speed of an object. The RADAR unit 255 may be configured to transmit a radio wave or a microwave pulse. The radio wave or the microwave pulse may be reflected by any object in a path of the wave. The object may return a part of energy of the wave to a receiver (for example, a dish antenna or an antenna), and the receiver may also be a part of the RADAR unit 255. The RADAR unit 255 may be further configured to perform digital signal processing on a received signal (reflected from an object), and may be configured to identify a target object.

Other systems similar to a RADAR are already used in other parts of an electromagnetic spectrum. An example is a LIDAR (light detection and ranging), which may use visible light from a laser instead of a radio wave.

The LIDAR unit 257 includes a sensor, where the sensor uses light to sense or detect a target object in the road environment in the sensing range of the fusion apparatus 200. Generally, the LIDAR is an optical remote sensing technology that may use light to illuminate a target to measure a distance to a target object or other attributes of the target object. For example, the LIDAR unit 257 may include a laser source and/or a laser scanner configured to transmit a laser pulse, and a detector configured to receive reflection of the laser pulse. For example, the LIDAR unit 257 may include a laser rangefinder based on reflection by a rotation mirror, and perform laser scanning around a digital scene in one dimension or two dimensions, to collect distance measurement values from a specified angle at specified intervals. In an example, the LIDAR unit 257 may include components such as a light (for example, laser) source, a scanner, an optical system, an optical detector, and a receiver or an electronic component, and a position and navigation system.

In an example, the LIDAR unit 257 may be configured to use ultraviolet (UV), visible light, or infrared light for object imaging, and may be applied to a wide range of target objects, including non-metallic objects. In an example, a narrow laser beam may be used to draw a map about physical features of an object with a high resolution.

In an example, wavelengths in a range from about 10 microns (infrared) to about 250 nanometers (UV) may be used. Light is generally reflected after backscattering. Different types of scattering, for example, Rayleigh scattering, Mie scattering, Raman scattering, and fluorescent, are used in different LIDAR applications. For example, based on different types of backscattering, the LIDAR may be therefore referred to as a Rayleigh laser RADAR, a Mie LIDAR, a Raman LIDAR, and a sodium/Fe/potassium fluorescent LIDAR. An appropriate combination of wavelengths may allow, for example, remote map drawing for an object by searching for a wavelength-dependent change of strength of a reflected signal.

Three-dimensional (3D) imaging may be implemented by using a scanning LIDAR system and a non-scanning LIDAR system. "A 3D gated viewing laser RADAR (3D gated viewing laser radar)" is an example of a non-scanning laser ranging system. A pulsed laser and a fast gated camera are applied in the 3D gated viewing laser RADAR. An imaging LIDAR may also be implemented by using a high-speed detector array and a modulation sensitive detector array built on a single chip generally by using CMOS (complementary metal oxide semiconductor) and CCD (hybrid complementary metal oxide semiconductor/charge coupled device) fabrication techniques. In the apparatuses, each pixel may be locally processed through high-speed demodulation or gating, so that the array can be processed to represent an image from a camera. This technology can be used to simultaneously obtain thousands of pixels to create a 3D point cloud representing an object or a scene detected by the LIDAR unit 257.

The point cloud may include a group of vertices in a 3D coordinate system. The vertices may be defined, for example, by X, Y, and Z coordinates, and may represent an outer surface of a target object. The LIDAR unit 257 may be configured to create a point cloud by measuring a large quantity of points on the surface of the target object, and may use the point cloud as a data file for outputting. As a result of a 3D scanning process performed on the object by using the LIDAR unit 257, the point cloud may be used to identify and visualize the target object.

In an example, the point cloud may be directly rendered to visualize the target object. In another example, the point cloud may be converted into a polygonal or triangular grid model in a process that may be referred to as surface reconstruction. Example technologies for converting the point cloud into a 3D surface may include: Delaunay triangulation, alpha shape, and rotating sphere. The technologies include constructing a triangular network on the existing vertices of the point cloud. Other example technologies may include converting the point cloud into a volume distance field, and reconstructing, by using a marching cubes algorithm, an implicit surface defined in this manner.

The camera 258 may be any camera (for example, a static camera or a video camera) configured to obtain an image of a road environment in which the vehicle is located. Therefore, the camera may be configured to detect visible light, or may be configured to detect light from other parts of spectrums (for example, infrared light or ultraviolet). Other types of cameras are also possible. The camera 258 may be a two-dimensional detector, or may have a three-dimensional space range. In some examples, the camera 258 may be, for example, a distance detector, and the camera 258 is configured to generate a two-dimensional image indicating distances from the camera 258 to several points in the environment. Therefore, the camera 258 may use one or more distance detection technologies. For example, the camera 258 may be configured to use a structured light technology. The fusion apparatus 200 uses a predetermined light pattern, for example, a grid or chessboard grid pattern, to illuminate an object in the environment, and uses the camera 258 to detect reflection of the predetermined light pattern from the object. Based on distortion in the reflected light pattern, the roadside sensing apparatus 258 may be configured to detect a distance to a point on the object. The predetermined light pattern may include infrared light or light of other wavelengths.

The I/O subsystem 270 is configured to control external input/output devices, and may include the another input device controller 271 and the sensor controller 272. In one embodiment, one or more other input control device controllers 271 receive a signal from the another input device 230 and/or send a signal to the another input device 230. The another input device 230 may include a physical button (push button, rocker arm button, or the like), a dial, a slider switch, a joystick, a scroll wheel, or an optical mouse (the optical mouse is a touch-sensitive surface that does not display a visual output, or is an extension of a touch-sensitive surface formed by a touchscreen). It should be noted that, the other input control device controller 271 may be connected to any one or more of the foregoing devices. The sensor controller 272 may receive a signal from one or more sensors 250 and/or send a signal to one or more sensors 250.

The processor 280 is a control center of the fusion apparatus 200. The processor 280 is connected to all parts of the entire fusion apparatus 200 by using various interfaces and lines, and executes various functions and data processing of the fusion apparatus 200 by running or executing a software program and/or module stored in the memory 220 and invoking data stored in the memory 220, thereby performing overall monitoring on the fusion apparatus 200. In one embodiment, the processor 280 may include one or more processing units. Preferably, the processor 280 may integrate two modem processors, where the modem processors mainly process wireless communication. It may be understood that, alternatively, the modem processors may not be integrated in the processor 280.

The fusion apparatus 200 further includes the power source 290 (such as a battery) for supplying power to the components. Preferably, the power source may be logically connected to the processor 280 by using a power management system, thereby implementing functions such as managing charging, discharging, and power consumption by using the power management system.

In Embodiment 1, the processor 280 of the fusion apparatus 200 executes the following instruction:

obtaining vehicle sensing data, where the vehicle sensing data is obtained by a vehicle sensing apparatus by sensing a road environment in a sensing range;

obtaining roadside sensing data, where the roadside sensing data is obtained by a roadside sensing apparatus by sensing a road environment in a sensing range; and fusing the vehicle sensing data and the roadside sensing data by using a fusion formula, to obtain a first fusion result.

In Embodiment 2, the processor 280 of the fusion apparatus 200 executes the following instruction:

receiving vehicle sensing data sent by at least one vehicle device, where the vehicle sensing data is obtained by a vehicle sensing apparatus by sensing a road environment in a sensing range;

fusing the vehicle sensing data of the at least one vehicle device and roadside sensing data by using a fusion formula, to obtain a first fusion result, where the roadside sensing data is obtained by a roadside sensing apparatus by sensing a road environment in a sensing range; and sending the first fusion result to a target vehicle device, where the target vehicle device is configured to fuse the vehicle sensing data and the first fusion result to obtain a second fusion result, and the target vehicle device belongs to the at least one vehicle device.

With reference to Embodiment 1 or Embodiment 2, the fusion formula is expressed as:

$$y = f(\text{result}_r, \text{result}_v),$$

where $\text{result}_r$ is a roadside result set, the roadside result set is used to indicate the roadside sensing data, $\text{result}_v$ is a vehicle result set, the vehicle result set is used to indicate the vehicle sensing data, y is the first fusion result, and the function f is used to obtain the first fusion result by mapping based on the roadside result set and the vehicle result set.

In one embodiment, $$f(\text{result}_r, \text{result}_v) = \frac{w_r}{w_r + w_v}\text{result}_r + \frac{w_v}{w_r + w_v}\text{result}_v,$$

where $w_r$ is a confidence factor of the roadside sensing apparatus, $w_r = (w_{r1}, w_{r2}, \ldots, w_{rM})$, $\text{result}_r$ (roadside$_1$, roadside$_2$, ..., roadside$_M$), M is a quantity of target objects in the sensing range of the roadside sensing apparatus, $w_{ri}$ is a confidence factor corresponding to a target object i in the sensing range of the roadside sensing apparatus, roadside$_i$ is a roadside result unit corresponding to the target object i in the sensing range of the roadside sensing apparatus, i is a natural number, 0<i≤M, $w_v$ is a confidence factor of the vehicle sensing apparatus, $w_v = (w_{v1}, w_{v2}, \ldots, w_{vN})$, $\text{result}_v$ (vehicle$_1$, vehicle$_2$, ..., vehicle$_N$), N is a quantity of target objects in the sensing range of the vehicle sensing apparatus, $w_{vj}$ is a confidence factor corresponding to a target object j in the sensing range of the vehicle sensing apparatus, vehicle$_j$ is a vehicle result unit corresponding to the target object j in the sensing range of the vehicle sensing apparatus, j is a natural number, and 0<j≤N.

In one embodiment, the confidence factor is determined based on a sensing apparatus parameter, a sensing distance of the target object, and a sensing angle of the target object together.

For example, the confidence factor w may be obtained based on the following formula:

$$w = g(S_k, R_i, \theta_j), w \in [0,1],$$

where $S_k$ is the sensing apparatus parameter, $R_i$ is the sensing distance of the target object, $\theta_j$ is the sensing angle of the target object, and g is a calibration parameter table obtained through calibration of a sensing apparatus.

In one embodiment, the vehicle result set includes at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

In one embodiment, one vehicle result unit in the at least one vehicle result unit is expressed as $vehicle_j$ ($p_{vj}$, $v_{vj}$, $s_{vj}$, $c_{vj}$), where $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the sensing range of the vehicle sensing apparatus, j is a natural number, and $0 < j \leq N$.

In one embodiment, the roadside result set includes at least one roadside result unit, a one-to-one correspondence exists between the at least one roadside result unit and at least one target object, and each roadside result unit in the at least one roadside result unit is used to describe a feature of a corresponding target object from a multidimensional angle.

In one embodiment, one roadside result unit in the at least one roadside result unit is expressed as $roadside_i$ ($p_{vi}$, $v_{vi}$, $s_{vi}$, $c_{vi}$), where $p_{vi}$ indicates a position of the target object i detected by the roadside sensing apparatus, $v_{vi}$ indicates a speed of the target object i detected by the roadside sensing apparatus, $s_{vi}$ indicates a size of the target object i detected by the roadside sensing apparatus, $c_{vi}$ indicates a color of the target object i detected by the roadside sensing apparatus, M is the quantity of target objects in the sensing range of the roadside sensing apparatus, i is a natural number, and $0 < i \leq M$.

With reference to Embodiment 1 or Embodiment 2, before the fusing the vehicle sensing data and the roadside sensing data by using a fusion formula, to obtain a fusion result, the method includes: matching the roadside sensing data with the vehicle sensing data to obtain a matching result; and fusing the vehicle sensing data and the roadside sensing data based on the matching result, to obtain the first fusion result.

In one embodiment, a matching relationship between a roadside result unit in the roadside result set and a vehicle result unit in the vehicle result set is found out by using a deviation network.

In one embodiment, that a matching relationship between a roadside result unit in the roadside result set and a vehicle result unit in the vehicle result set is found out by using a deviation network includes:

finding out the matching relationship between the roadside result unit in the roadside result set and the vehicle result unit in the vehicle result set by using the following formula: S=Deviation ($roadside_i$, $vehicle_j$), where S is a matching result, Deviation is the deviation network, $roadside_i$ is the roadside result unit corresponding to the target object i in the sensing range of the roadside sensing apparatus, $vehicle_j$ is the vehicle result unit corresponding to the target object j in the sensing range of the vehicle sensing apparatus, and both i and j are natural numbers.

In one embodiment, after the matching the roadside sensing data with the vehicle sensing data to obtain a matching result, the method includes: evaluating confidence of the matching result in a manner of interframe loopback and/or multiframe correlation to obtain an evaluation result; and adjusting the deviation network based on the evaluation result.

In one embodiment, the interframe loopback is $T_{loopback} = T_1 + T_2 + T_3 + T_4$, where $T_{loopback}$ is the interframe loopback, $T_1$ is a first matching result, $T_2$ is a second matching result, $T_3$ is a third matching result, $T_4$ is a fourth matching result, the first matching result is a matching result between a roadside result unit corresponding to the target object j detected by the roadside sensing apparatus in an $i^{th}$ frame and a vehicle result unit corresponding to the target object j detected by the vehicle sensing apparatus in the $i^{th}$ frame, the second matching result is a matching result between the vehicle result unit corresponding to the target object j detected by the vehicle sensing apparatus in the $i^{th}$ frame and a vehicle result unit corresponding to the target object j detected by the vehicle sensing apparatus in an $(i+1)^{th}$ frame, the third matching result is a matching result between the vehicle result unit corresponding to the target object j detected by the vehicle sensing apparatus in the $(i+1)^{th}$ frame and a roadside result unit corresponding to the target object j detected by the roadside sensing apparatus in the $(i+1)^{th}$ frame, and the fourth matching result is a matching result between the roadside result unit corresponding to the target object j detected by the roadside sensing apparatus in the $(i+1)^{th}$ frame and the roadside result unit corresponding to the target object j detected by the roadside sensing apparatus in the $i^{th}$ frame.

In one embodiment, the multiframe correlation is defined as $T_{multiframe} = T_{loopback12} + T_{loopback23} + T_{loopback34} + \ldots$, where $T_{multiframe}$ is the multiframe correlation, $T_{loopback12}$ is interframe loopback between a first frame and a second frame, $T_{loopback23}$ is interframe loopback between the second frame and a third frame, $T_{loopback34}$ is interframe loopback between the third frame and a fourth frame, . . . .

It should be noted that, for content not mentioned in the embodiment in FIG. 12, reference may be made to the embodiments corresponding to FIG. 8 to FIG. 10. Details are not described again herein.

Figure 13:
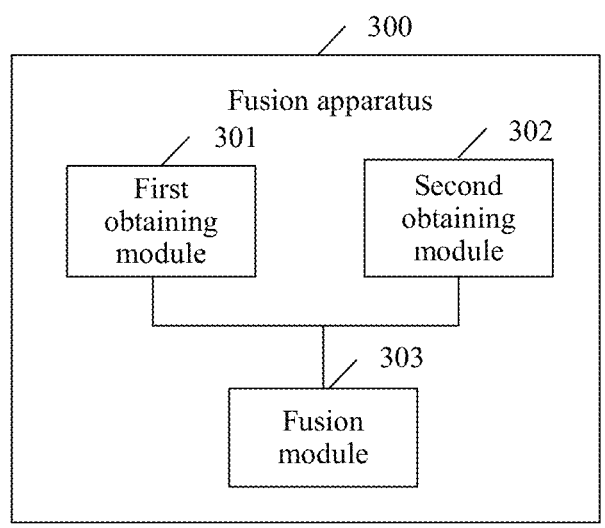

Based on a same inventive concept, FIG. 13 is a schematic structural diagram of a fusion apparatus according to an embodiment. As shown in FIG. 13, the fusion apparatus 300 may include a first obtaining module 301, a second obtaining module 302, and a fusion module 303.

The first obtaining module 301 is configured to obtain vehicle sensing data, where the vehicle sensing data is obtained by a vehicle sensing apparatus by sensing a road environment in a sensing range.

The second obtaining module 302 is configured to obtain roadside sensing data, where the roadside sensing data is obtained by a roadside sensing apparatus by sensing a road environment in a sensing range.

The fusion module 303 is configured to fuse the vehicle sensing data and the roadside sensing data by using a fusion formula, to obtain a first fusion result.

It should be noted that, for content not mentioned in the embodiment in FIG. 13 and implementation of each functional unit, reference may be made to the embodiments corresponding to FIG. 8 and FIG. 9. Details are not described again herein.

Figure 14:
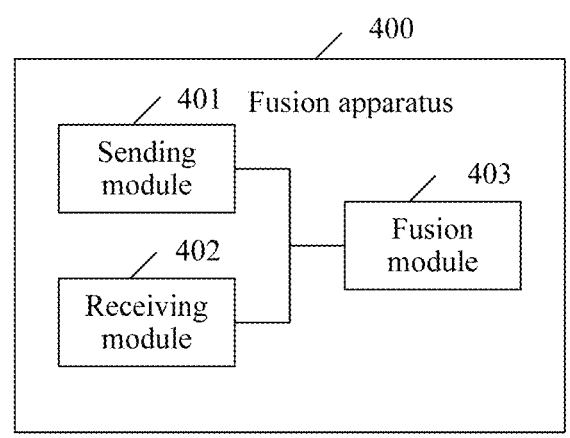

Based on a same inventive concept, FIG. 14 is a schematic structural diagram of a fusion apparatus according to an embodiment. As shown in FIG. 14, the fusion apparatus 400 in this embodiment includes a sending module 401, a receiving module 402, and a fusion module 403.

The sending module 401 is configured to send vehicle sensing data to a roadside device, where the vehicle sensing data is obtained by a vehicle sensing apparatus by sensing a road environment in a sensing range.

The receiving module 402 is configured to receive a first fusion result sent by the roadside device, where the first fusion result is obtained by the roadside device by fusing vehicle sensing data of at least one vehicle device and roadside sensing data by using a fusion formula, and the roadside sensing data is obtained by a roadside sensing apparatus by sensing a road environment in a sensing range.

The fusion module 403 is configured to fuse the vehicle sensing data of the at least one vehicle device and the first fusion result to obtain a second fusion result.

It should be noted that, for content not mentioned in the embodiment in FIG. 14 and implementation of each functional unit, reference may be made to the embodiment corresponding to FIG. 10. Details are not described again herein.

According to the foregoing solutions, the roadside sensing data obtained by the roadside sensing apparatus by sensing and the vehicle sensing data obtained by the vehicle sensing apparatus by sensing are fused to implement overlapping between the sensing range of the roadside sensing apparatus and the sensing range of the vehicle sensing apparatus, so that the sensing range is effectively extended.

In the several embodiments provided in this application, it should be understood that the disclosed system, terminal, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data fusion method comprising:
obtaining vehicle sensing data, wherein the vehicle sensing data is obtained by a vehicle sensing apparatus by sensing a road environment in a first sensing range;
obtaining roadside sensing data, wherein the roadside sensing data is obtained by a roadside sensing apparatus by sensing the road environment in a second sensing range; and
fusing, using the processor, the vehicle sensing data and the roadside sensing data by using a fusion formula to obtain a first fusion result with a wider sensing range than the first sensing range and the second sensing range;
wherein the fusion formula is expressed as:

$$y = f(\text{result}_r, \text{result}_v)$$

wherein $\text{result}_r$ is a roadside result set, the roadside result set being used to indicate the roadside sensing data, $\text{result}_v$ is a vehicle result set, the vehicle result set being used to indicate the vehicle sensing data, y is the first fusion result, and the function f is used to obtain the first fusion result by mapping based on the roadside result set and the vehicle result set; and
wherein $$f(\text{result}_r, \text{result}_v) = \frac{w_r}{w_r + w_v}\text{result}_r + \frac{w_v}{w_r + w_v}\text{result}_v,$$

wherein $w_r$ is a confidence factor of the roadside sensing apparatus, $w_r = (w_{r1}, w_{r2}, w_{rM})$, $\text{result}_r$ (roadside$_1$, roadside$_2$, . . . , roadside$_M$), M is a quantity of target objects in the second sensing range of the roadside sensing apparatus, $w_{ri}$ is a confidence factor corresponding to a target object i in the second sensing range of the roadside sensing apparatus, roadside$_i$ is a roadside result unit corresponding to the target object i in the second sensing range of the roadside sensing apparatus, i is a natural number, $0 < i \leq M$, $w_v$ is a confidence factor of the vehicle sensing apparatus, $w_v = (w_{v1}, w_{v2}, w_{vN})$, $\text{result}_v$ (vehicle$_1$, vehicle$_2$, . . . , vehicle$_N$), N is a quantity of target objects in the first sensing range of the vehicle sensing apparatus, $w_{vj}$ is a confidence factor corresponding to a target object j in the first sensing range of the vehicle sensing apparatus, vehicle$_j$ is a vehicle result unit corresponding to the target object j in the first sensing range of the vehicle sensing apparatus, j is a natural number, and $0 < j \leq N$.

2. The method according to claim 1, wherein the confidence factor is determined based on a sensing apparatus parameter, a sensing distance of the target object, and a sensing angle of the target object together.

3. The method according to claim 2, wherein the confidence factor w may be obtained based on the following formula:

$$w=g(S_k,R_j,\theta_j), w\in[0,1],$$

wherein $S_k$ is the sensing apparatus parameter, is the sensing distance of the target object, $\theta_j$ is the sensing angle of the target object, and g is a calibration parameter table obtained through calibration of a sensing apparatus.

4. The method according to claim 1, wherein the vehicle result set comprises at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

5. The method according to claim 4, wherein any vehicle result unit in the at least one vehicle result unit is expressed as vehicles ($p_{vj}$, $v_{vj}$, $s_{vj}$, $c_{vj}$), wherein $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the first sensing range of the vehicle sensing apparatus, j is a natural number, and 0<j≤N.

6. The method according to claim 1, wherein the roadside result set comprises at least one roadside result unit, a one-to-one correspondence exists between the at least one roadside result unit and at least one target object, and each roadside result unit in the at least one roadside result unit is used to describe a feature of a corresponding target object from a multidimensional angle.

7. The method according to claim 6, wherein any roadside result unit in the at least one roadside result unit is expressed as roadside$_i$ ($p_{vi}$, $v_{vi}$, $s_{vi}$, $c_{vi}$), wherein $p_{vi}$ indicates a position of the target object i detected by the roadside sensing apparatus, $v_{vi}$ indicates a speed of the target object i detected by the roadside sensing apparatus, $s_{vi}$ indicates a size of the target object i detected by the roadside sensing apparatus, $c_{vi}$ indicates a color of the target object i detected by the roadside sensing apparatus, M is the quantity of target objects in the second sensing range of the roadside sensing apparatus, i is a natural number, and 0<i≤M.

8. The method according to claim 1, wherein before fusing the vehicle sensing data and the roadside sensing, the method further comprises:
matching the roadside sensing data with the vehicle sensing data to obtain a matching result; and
wherein fusing the vehicle sensing data and the roadside sensing data comprises:
fusing the vehicle sensing data and the roadside sensing data based on the matching result to obtain the first fusion result.

9. The method according to claim 8, wherein the matching the roadside sensing data with the vehicle sensing data to obtain a matching result comprises:
finding out a matching relationship between a roadside result unit in the roadside result set and a vehicle result unit in the vehicle result set by using a deviation network.

10. The method according to claim 9, wherein the finding out a matching relationship between a roadside result unit in the roadside result set and a vehicle result unit in the vehicle result set by using a deviation network comprises: finding out the matching relationship between the roadside result unit in the roadside result set and the vehicle result unit in the vehicle result set by using the following formula: S=Deviation (roadside$_i$, vehicle$_j$), wherein S is a matching result, Deviation is the deviation network, roadside$_i$ is the roadside result unit corresponding to the target object i in the second sensing range of the roadside sensing apparatus, vehicle$_j$ is the vehicle result unit corresponding to the target object j in the first sensing range of the vehicle sensing apparatus, and both i and j are natural numbers.

11. A fusion apparatus comprising:
at least one processor; and
a non-transitory computer-readable storage medium coupled to the at least one processor and storing programming instructions for execution by the at least one processor, the programming instructions to instruct the at least one processor to perform the following operations:
obtaining vehicle sensing data, wherein the vehicle sensing data is obtained by a vehicle sensing apparatus by sensing a road environment in a first sensing range;
obtaining roadside sensing data, wherein the roadside sensing data is obtained by a roadside sensing apparatus by sensing the road environment in a second sensing range; and
fusing, using the at least one processor, the vehicle sensing data and the roadside sensing data by using a fusion formula to obtain a first fusion result with a wider sensing range than the first sensing range and the second sensing range;
wherein the fusion formula is expressed as:

$$y=f(\text{result}_r, \text{result}_v)$$

wherein result$_r$ is a roadside result set, the roadside result set being used to indicate the roadside sensing data, result$_v$ is a vehicle result set, the vehicle result set being used to indicate the vehicle sensing data, y is the first fusion result, and the function f is used to obtain the first fusion result by mapping based on the roadside result set and the vehicle result set; and
wherein $$f(\text{result}_r, \text{result}_v)=w_r/w_r+w_v \cdot \text{result}_r+w_v/w_r+w_v \cdot \text{result}_v,$$

wherein $w_r$ is a confidence factor of the roadside sensing apparatus, $w_r=(w_{r1}, w_{r2}, \ldots, w_{rM})$, result$_r$ (roadside$_1$, roadside$_2$, . . . , roadside$_M$), M is a quantity of target objects in the second sensing range of the roadside sensing apparatus, $w_{ri}$ is a confidence factor corresponding to a target object i in the second sensing range of the roadside sensing apparatus, roadside$_i$ is a roadside result unit corresponding to the target object i in the second sensing range of the roadside sensing apparatus, i is a natural number, 0<i≤M, $w_v$ is a confidence factor of the vehicle sensing apparatus, $w_v=(w_{v1}, w_{v2}, \ldots, w_{vN})$, result$_v$ (vehicle$_1$, vehicle$_2$, . . . , vehicle$_N$), N is a quantity of target objects in the first sensing range of the vehicle sensing apparatus, $w_{vj}$ is a confidence factor corresponding to a target object j in the first sensing range of the vehicle sensing apparatus, vehicle$_j$ is a vehicle result unit corresponding to the target object j in the first sensing range of the vehicle sensing apparatus, j is a natural number, and 0<j≤N.

12. The apparatus according to claim 11, wherein the confidence factor is determined based on a sensing apparatus parameter, a sensing distance of the target object, and a sensing angle of the target object together.

13. The apparatus according to claim 12, wherein the confidence factor w may be obtained based on the following formula:

$$w=g(S_k,R_i,\theta_j), w\in[0,1]$$

wherein $S_k$ is the sensing apparatus parameter, is the sensing distance of the target object, $\theta_j$ is the sensing angle of the target object, and g is a calibration parameter table obtained through calibration of a sensing apparatus.

14. The apparatus according to claim 11, wherein the vehicle result set comprises at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

15. The apparatus according to claim 14, wherein any vehicle result unit in the at least one vehicle result unit is expressed as vehicles ($p_{vj}$, $v_{vj}$, $s_{vj}$, $c_{vj}$), wherein $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the first sensing range of the vehicle sensing apparatus, j is a natural number, and $0<j\leq N$.

16. A non-transitory computer-readable storage medium, comprising an instruction, wherein when the instruction is run on a fusion apparatus, the fusion apparatus is enabled to perform a method comprising:
  obtaining vehicle sensing data, wherein the vehicle sensing data is obtained by a vehicle sensing apparatus by sensing the road environment in a first sensing range;
  obtaining roadside sensing data, wherein the roadside sensing data is obtained by a roadside sensing apparatus by sensing the road environment in a second sensing range; and
  fusing, using a processor, the vehicle sensing data and the roadside sensing data by using a fusion formula to obtain a first fusion result with a wider sensing range than the first sensing range and the second sensing range;
wherein the fusion formula is expressed as:

$$y=f(result_r, result_v)$$

wherein $result_r$ is a roadside result set, the roadside result set being used to indicate the roadside sensing data, $result_v$ is a vehicle result set, the vehicle result set being used to indicate the vehicle sensing data, y is the first fusion result, and the function f is used to obtain the first fusion result by mapping based on the roadside result set and the vehicle result set; and
wherein $$f(result_r, result_v)=w_r/w_r+w_v\cdot result_r+w_v/w_r+w_v\cdot result_v,$$

wherein $w_r$ is a confidence factor of the roadside sensing apparatus, $w_r=(w_{r1}, w_{r2}, \ldots, w_{rM})$, $result_r$ (roadside$_1$, roadside$_2$, ..., roadside$_M$), M is a quantity of target objects in the second sensing range of the roadside sensing apparatus, $w_{ri}$ is a confidence factor corresponding to a target object i in the second sensing range of the roadside sensing apparatus, roadside$_i$ is a roadside result unit corresponding to the target object i in the second sensing range of the roadside sensing apparatus, i is a natural number, $0<i\leq M$, $w_v$ is a confidence factor of the vehicle sensing apparatus, $w_v=(w_{v1}, w_{v2}, \ldots, w_{vN})$, $result_v$ (vehicle$_1$, vehicle$_2$, ..., vehicle$_N$), N is a quantity of target objects in the first sensing range of the vehicle sensing apparatus, $w_{vj}$ is a confidence factor corresponding to a target object j in the first sensing range of the vehicle sensing apparatus, vehicle$_j$ is a vehicle result unit corresponding to the target object j in the first sensing range of the vehicle sensing apparatus, j is a natural number, and $0<j\leq N$.

17. The non-transitory computer-readable medium according to claim 16, wherein the confidence factor is determined based on a sensing apparatus parameter, a sensing distance of the target object, and a sensing angle of the target object together.

18. The non-transitory computer-readable medium according to claim 17, wherein the confidence factor w may be obtained based on the following formula:

$$w=g(S_k,R_i,\theta_j), w\in[0,1],$$

wherein $S_k$ is the sensing apparatus parameter, $R_i$ is the sensing distance of the target object, $\theta_j$ is the sensing angle of the target object, and g is a calibration parameter table obtained through calibration of a sensing apparatus.

19. The non-transitory computer-readable medium according to claim 16, wherein the vehicle result set comprises at least one vehicle result unit, a one-to-one correspondence exists between the at least one vehicle result unit and at least one target object, and each vehicle result unit in the at least one vehicle result unit is used to describe a feature of a corresponding target object from a multidimensional angle.

20. The non-transitory computer-readable medium according to claim 19, wherein any vehicle result unit in the at least one vehicle result unit is expressed as vehicle$_j$ ($p_{vj}$, $v_{vj}$, $s_{vj}$, $c_{vj}$), wherein $p_{vj}$ indicates a position of the target object j detected by the vehicle sensing apparatus, $v_{vj}$ indicates a speed of the target object j detected by the vehicle sensing apparatus, $s_{vj}$ indicates a size of the target object j detected by the vehicle sensing apparatus, $c_{vj}$ indicates a color of the target object j detected by the vehicle sensing apparatus, N is the quantity of target objects in the first sensing range of the vehicle sensing apparatus, j is a natural number, and $0<j\leq N$.

* * * * *

UNITED STATES PATENT AND TRADEMARK OFFICE
CERTIFICATE OF CORRECTION

PATENT NO. : 11,987,250 B2
APPLICATION NO. : 17/021911
DATED : May 21, 2024
INVENTOR(S) : Huan Yu, Xiao Yang and Yonggang Song It is certified that error appears in the above-identified patent and that said Letters Patent is hereby corrected as shown below:

In the Claims

In Claim 1, Column 38, Line 23, delete "fusing, using the processor" and insert --fusing, using a processor--.

In Claim 1, Column 38, Line 46, delete "$w_r = (w_{r1}, w_{r2}, w_{rM})$" and insert --$w_r = (w_{r1}, w_{r2}, ..., w_{rM})$--.

In Claim 1, Column 38, Line 55, delete "$w_r = (w_{r1}, w_{r2}, w_{rM})$" and insert --$w_r = (w_{r1}, w_{r2}, ..., w_{rM})$--.

In Claim 15, Column 41, Line 20, delete "expressed as vehicles" and insert --expressed as vehicle$_j$--.

Signed and Sealed this
Thirteenth Day of August, 2024

Katherine Kelly Vidal
*Director of the United States Patent and Trademark Office*